(12) United States Patent
Viswanathan

(10) Patent No.: US 10,127,461 B2
(45) Date of Patent: Nov. 13, 2018

(54) VISUAL ODOMETRY FOR LOW ILLUMINATION CONDITIONS USING FIXED LIGHT SOURCES

(71) Applicant: HERE Global B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 194 days.

(21) Appl. No.: 15/235,326

(22) Filed: Aug. 12, 2016

(65) Prior Publication Data

US 2018/0047147 A1 Feb. 15, 2018

(51) Int. Cl.
*G06T 7/00* (2017.01)
*G06K 9/00* (2006.01)
(Continued)

(52) U.S. Cl.
CPC .......... *G06K 9/00798* (2013.01); *G06T 7/004* (2013.01); *G06T 7/20* (2013.01);
(Continued)

(58) Field of Classification Search
CPC . G06T 7/004; G06T 7/20; G06T 2207/10024; G06T 7/246; G06T 7/269; G06T 2207/10016; G06T 2207/30244; G06T 2207/30256; G06K 9/00798; H04N 5/2256
See application file for complete search history.

(56) References Cited

U.S. PATENT DOCUMENTS 9,140,792 B2 9/2015 Zeng
9,280,832 B2 3/2016 Cleveland et al.
(Continued)

FOREIGN PATENT DOCUMENTS

EP 2879385 A1 6/2015
WO WO 2016/079466 A1 5/2016

OTHER PUBLICATIONS

Fraundorfer, Friedrich, et al., "Visual Odometry Part II: Matching, Robustness, Optimization, and Applications", *IEEE Robotics & Automation Magazine*, Jun. 2012, pp. 78-90, vol. 19, Issue 2, IEEE, U.S.A.
(Continued)

*Primary Examiner* — Yon J Couso
(74) *Attorney, Agent, or Firm* — Alston & Bird LLP

(57) ABSTRACT

First and second image data is captured comprising a first and second image, respectively. A fixed light source is identified in each of the first and second images. A first ground plane is determined in the first image data. A first (second) intersection is determined, wherein the first (second) intersection is a point in the first image where a virtual lamp post corresponding to the fixed light source in the first (second) image intersects with the first (second) ground plane. The first image data and the second image data are transformed to provide a first and second inverse perspective map (IPM) comprising a first transformed intersection and a second transformed intersection, respectively. Movement parameters are determined based on the location of the first transformed intersection in the first IPM and the location of the second transformed intersection in the second IPM.

21 Claims, 5 Drawing Sheets

(51) Int. Cl.
    G06T 7/20       (2017.01)
    H04N 5/225      (2006.01)
    G06T 7/246      (2017.01)
    G06T 7/269      (2017.01)
(52) U.S. Cl.
    CPC .............. *G06T 7/246* (2017.01); *G06T 7/269*
              (2017.01); *H04N 5/2256* (2013.01); *G06T*
              *2207/10016* (2013.01); *G06T 2207/10024*
              (2013.01); *G06T 2207/30244* (2013.01); *G06T*
              *2207/30256* (2013.01)

(56) References Cited

U.S. PATENT DOCUMENTS

| | | | |
|---|---|---|---|
| 2005/0226522 | A1 | 10/2005 | Gallagher |
| 2011/0282578 | A1 | 11/2011 | Miksa et al. |
| 2015/0008294 | A1* | 1/2015 | Desbordes ............ B61L 25/021 246/122 R |
| 2015/0235099 | A1 | 8/2015 | Lee et al. |
| 2015/0332114 | A1 | 11/2015 | Springer |
| 2015/0332117 | A1 | 11/2015 | Zhou et al. |
| 2016/0019419 | A1 | 1/2016 | Chen |
| 2016/0110878 | A1* | 4/2016 | Chang ....................... G06T 7/73 382/103 |
| 2016/0267331 | A1 | 9/2016 | Pillai et al. |
| 2017/0336801 | A1* | 11/2017 | Shashua ............... G05D 1/0278 |
| 2017/0347030 | A1* | 11/2017 | Guerreiro .......... H04N 5/23267 |

OTHER PUBLICATIONS

Kitt, Bernd, et al., "Visual Odometry based on Stereo Image Sequences with RANSAC-based Outlier Rejection Scheme", Proceedings of IEEE 2010 Intelligent Vehicles Symposium, Jun. 21-24, 2010, 7 pages, San Diego, California, retrieved from <http://www.cvlibs.net/publications/Kitt2010IV.pdf> on Jan. 12, 2017.

Lowry, Stephanie Margaret, "Visual Place Recognition for Persistent Robot Navigation in Changing Environments", Doctor of Philosophy Thesis, School of Electrical Engineering and Computer Science, Queensland University of Technology, 2014, 191 pages, retrieved from <http://eprints.qut.edu.au/79404/1/Stephanie_Lowry_Thesis.pdf> on Jan. 12, 2017.

Milford, Michael, et al., "Vision-based Simultaneous Localization and Mapping in Changing Outdoor Environments", *Journal of Field Robotics*, 2014, pp. 780-802, vol. 31, Issue 5, Wiley Periodicals, Inc., U.S.A.

Nelson, Peter, et al., "From Dusk till Dawn: Localisation at Night using Artificial Light Sources", 8 pages, Proceedings of IEEE International Conference on Robotics and Automation, May 26-30, 2015, 8 pages, Seattle, Washington, retrieved from <http://www.robots.ox.ac.uk/~mobile/Papers/2015ICRA_Nelson.pdf> on Jan. 12, 2017.

Sabattini, Lorenzo, et al., "Bird's-Eye View Image for the Localization of a Mobile Robot by Means of Trilateration", Proceedings of the IFAC Symposium on Intelligent Autonomous Vehicles, Sep. 6, 2010, 6 pages, vol. 7, Lecce, Italy, retrieved from <http://www.arscontrol.org/publications/2010-SabSecFanSte-IAV.pdf> on Jan. 12, 2017.

Scaramuzza, Davide, et al., "Visual Odometry Part I: The First 30 Years and Fundamentals", *IEEE Robotics & Automation Magazine*, Dec. 2011, pp. 80-92, vol. 18, Issue 4, IEEE, U.S.A.

Van Hamme, David, et al., "Robust Visual Odometry using Uncertainty Models", Proceedings of ACIVS 2011, Aug. 22-25, 2011, 12 pages, Ghent, Belgium, retrieved from <https://biblio.ugent.be/publication/1965938/file/6763235> on Jan. 12, 2017.

Wei, Lijun, "Multi-sources fusion based vehicle localization in urban environments under a loosely coupled probabilistic framework", Doctoral Thesis, Universit'e de Technologic de Belfort—Montbeliard, Jul. 17, 2013, 187 pages, retrieved from <https://tel.archives-ouvertes.fr/tel-01004660/document> on Jan. 12, 2017.

Fleischer, K., et al., "Machine-Vision-Based Detection and Tracking of Stationary Infrastructure Objects Beside Innercity Roads", Proceedings of IEEE Intelligent Transportation Systems, Aug. 25-29, 2001, pp. 525-530, Oakland, CA.

Glenn, J., et al., "Calibration and Use of Camera-Based Systems for Road Lighting Assessment", International Journal of Lighting Research and Technology, Apr. 12, 2000, pp. 33-40, vol. 32, No. 1, Great Britain.

International Searching Authority, International Search Report and Written Opinion for International Application No. PCT/EP2017/070369, dated Nov. 9, 2017, 18 pages, European Patent Office, Netherlands.

Geiger, Andreas, "LIBVISO2: C++ Library for Visual Odometry 2", Jun. 30, 2013-Apr. 12, 2017, 5 pages, Internet Achieve <https://web.archive.org/web/20150802230330/http://www.cvlibs.net/software/libviso/> on Apr. 25, 2017.

Grauman, Kristen, et al., "Visual Object Recognition", *Synthesis Lectures on Computer Vision* #1, Jan. 27, 2011, 172 pages, retrieved from <http://cs.gmu.edu/~kosecka/cs482/grauman-recognition-draft-27-01-11.pdf> on Apr. 25, 2017.

Seo, Young-Woo, et al., "Ortho-Image Analysis for Producing Lane-Level Highway Maps" (Research Paper), Carnegie Mellon University, Sep. 2012, 29 pages, retrieved from <http://repository.cmu.edu/cgi/viewcontent.cgi?article=2085&context=robotics> on Apr. 25, 2017.

Shindler, Michael, et al., "Fast and Accurate k-means for Large Datasets", Proceedings of 25th Annual Conference on Neural Information Processing Systems, Dec. 12-14, 2011, Granada, Spain, retrieved from <http://papers.nips.cc/paper/4362-fast-and-accurate-k-means-for-large-datasets.pdf> on Apr. 25, 2017.

* cited by examiner

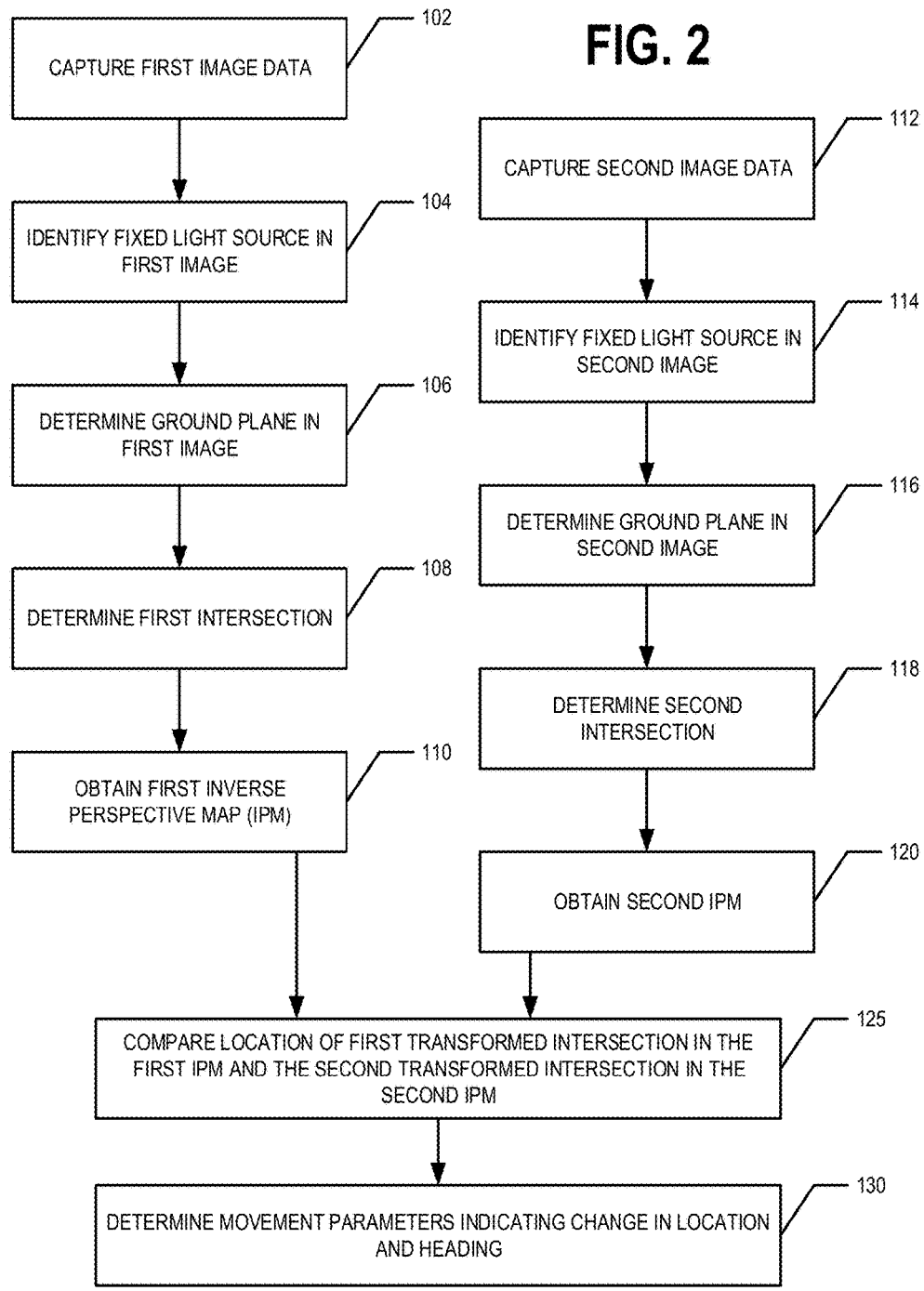

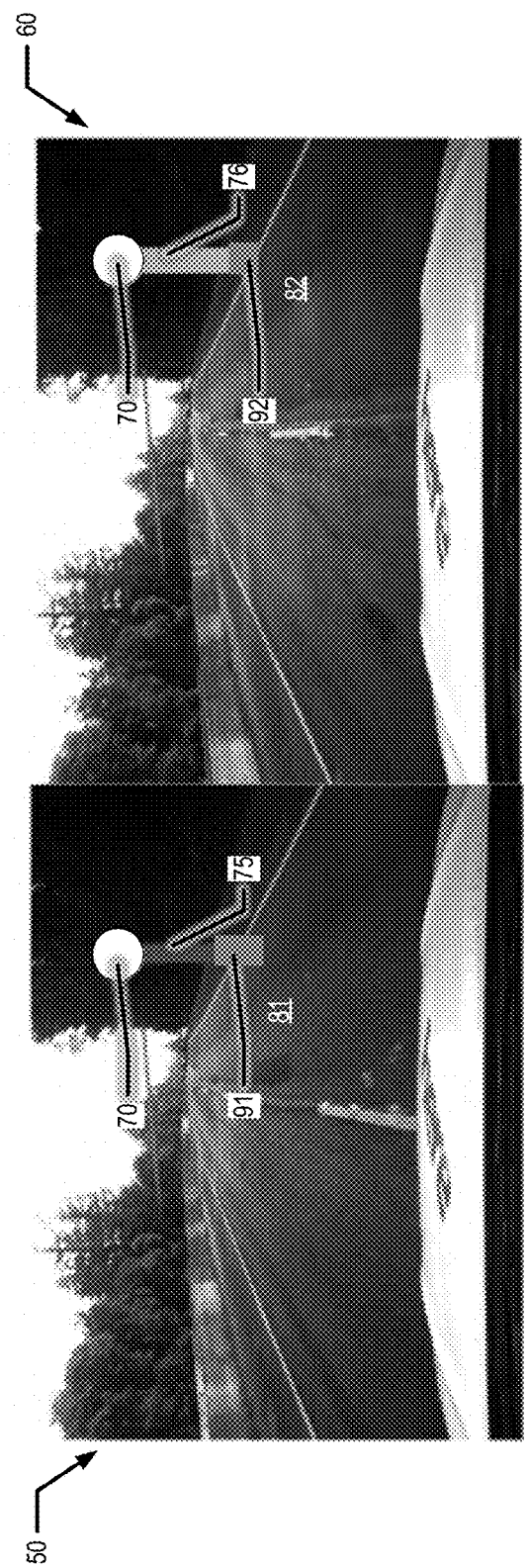

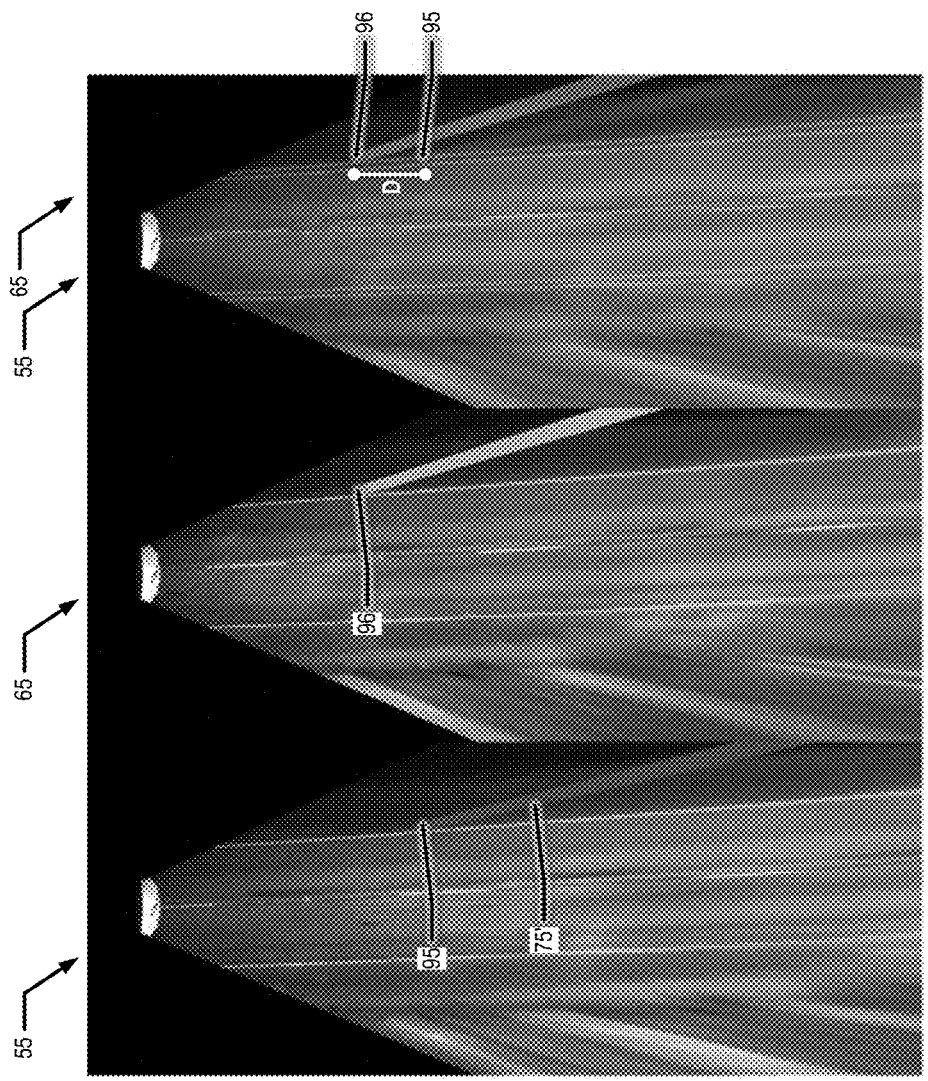

VISUAL ODOMETRY FOR LOW ILLUMINATION CONDITIONS USING FIXED LIGHT SOURCES

TECHNOLOGICAL FIELD

Example embodiments relate generally to performing visual odometry in low illumination conditions. In particular, example embodiments generally relate to performing visual odometry in low illumination conditions to monitor movement of an object, such as a vehicle, in real-time or near real-time.

BACKGROUND

Visual odometry is the process of incrementally estimating the current state of an object (defined as position and heading) using only camera images. Typical monocular visual odometry comprises feature extraction, feature matching between images, motion estimation, and local optimization. The features, typically extracted at corner points (e.g., corners of buildings and/or the like), are used to establish the correspondence between two temporally spaced monocular images. A feature matching framework is employed to filter out incorrect correspondences and return a list of pixel-wise matches. The motion estimation step uses the pairwise matches and the camera matrix to recover the translation and rotation between the matched features. The local optimization step constrains the space of rotation and translation so that the visible triangulated feature points remain consistent across all the frames.

The feature extraction and matching steps in typical visual odometry are highly sensitive to illumination conditions. Typical feature locations, such as those associated with corner points, are unstable across changes in scale, and orientation. Additionally, standard monocular or stereo visual odometry requires highly textured regions to perform image matching. As a result, the lack of texture and discernable features in the imagery captured in low illumination conditions, such as at dusk and during the night, may cause the system to incorrectly estimate the state of the object. The lack of ambient illumination causes traditional visual odometry systems to fail due to insufficient discernible features and/or texture to effectively perform the matching of features between images and the local optimization.

BRIEF SUMMARY

Example embodiments allow for visual odometry to be performed under low illumination conditions. For example, as a mode of transportation is traveling, first image data comprising a first image may be captured. The first image data may be processed to identify one or more fixed light sources within the first image and a first ground plane within the first image. A first intersection may be identified in the first image by extending a virtual lamp post vertically downward from the center of the fixed light source in the first image to the first ground plane. The intersection of the virtual lamp post with the first ground plane is the first intersection. As the mode of transportation travels, second image data that comprises a second image may be captured. The second image may sufficiently overlap with the first image such that the fixed light source is present in both the first and second images. A second intersection may be identified in the second image as the intersection of a second virtual lamp post that extends downward from the center of the fixed light source in the second image intersecting with the second ground plane in the second image. The first and second images may be transformed into inverse perspective maps (IPMs), wherein the first IPM comprises a first transformed intersection that is the mapping of the first intersection into the first IPM and the second IPM comprises a second transformed intersection that is the mapping of the second intersection into the second IPM. The locations of the location of the first transformed intersection in the first IPM and the location of the second transformed intersection in the second IPM may be used to determine one or more movement parameters describing and/or related to the translation and/or rotation of the mode of transportation between the moment the first image data was captured and the moment the second image data was captured. The one or more movement parameters may be determined in real-time or near real-time.

Methods, apparatus, and computer program products are provided in accordance with an example embodiment in order to perform visual odometry in low illumination conditions. In example embodiments, first image data comprising a first image is captured. The first image is captured by an imaging device. A fixed light source is identified from the first image data. A first ground plane is determined in the first image data. A first intersection is determined in the first image. The first intersection is a point in the first image where a virtual lamp post corresponding to the fixed light source in the first image intersects with the first ground plane. The virtual lamp post extends vertically from the fixed light source in the first image to the first ground plane. Second image data comprising a second image is captured. The second image is captured by the imaging device. The second image sufficiently overlaps with the first image. The fixed light source is identified in the second image data. A second intersection is determined. The second intersection is the point in the second image where a virtual lamp corresponding to the fixed light source in the second image intersects a second ground plane. The first image data and the second image data are transformed to obtain a first inverse perspective map (IPM) comprising a first transformed intersection and a second IPM comprising a second transformed intersection. Based at least in part on the first transformed intersection and the second transformed intersection, one or more movement parameters related to movement of the imaging device between the capturing of the first image data and the capturing of the second image data are determined.

In accordance with an example embodiment, a method is provided. The method comprises capturing first image data comprising a first image. The first image is captured by an imaging device. The method further comprises identifying a fixed light source from the first image data; determining a first ground plane in the first image data; and determining a first intersection. The first intersection is a point in the first image where a virtual lamp post corresponding to the fixed light source in the first image intersects with the first ground plane. The virtual lamp post extends vertically from the fixed light source to the first ground plane. The method further comprises capturing second image data comprising a second image. The second image is captured by the imaging device. The second image sufficiently overlaps with the first image. The method further comprises identifying the fixed light source in the second image data; and determining a second intersection. The second intersection is the point in the second image where a virtual lamp post corresponding to the fixed light source in the second image intersects with a second ground plane. The method further comprises transforming the first image data and the second image data to obtain a first inverse perspective map comprising a first transformed intersection and a second inverse perspective map comprising a second transformed intersection; and based at least in part on the first transformed intersection and the second transformed intersection, determining one or more movement parameters related to movement of the imaging device between the capturing of the first image data and the capturing of the second image data.

In example embodiments, the movement parameters comprise at least one selected from the group of (a) one or more translation parameters, (b) one or more rotation parameters, (c) a distance traveled, (d) a position, (e) a speed, (f) a velocity, and (g) a heading. In example embodiments, the method further comprises determining the second ground plane in the second image data. In example embodiments, the first ground plane is same as the second ground plane. In example embodiments, the imaging device is affixed to a mode of transportation at either a fixed height, a known height, or both. In example embodiments, the first and/or second ground plane is determined by computing a homography based at least in part on the first or second image data. In example embodiments the height of the imaging device is determined based on either a length of a lane marking, the distance between consecutive lane markings, width of a lane between a pair of lane markings, or combination thereof based on an image captured by the imaging device. In example embodiments, the first and/or second ground plane is determined using gradients in a color and/or intensity profile of the first or second image data, changes in the color and/or intensity profile of the first or second image data, or a combination thereof. In example embodiments, the first and/or second ground plane is determined based at least in part on one or more local road features identified in at least the first or second image data and another set of captured image data. In example embodiments, the first and/or second ground plane is determined based at least in part on one or more objects identified in the first and/or second images. In example embodiments, a slope of the first and/or second ground plane is inferred based at least in part on an illumination profile caused by a light source associated with a mode of transportation to which the imaging device is affixed reflecting off a surface corresponding to the first and/or second ground plane. In example embodiments, a slope of the first and/or second ground plane is inferred based on the position of one or more lane markings within the first or second image data. In example embodiments, the method further comprises performing a full reconstruction of a surface using dense optical flow techniques for areas illuminated by a light source associated with a mode of transportation to which the imaging device is affixed, wherein the surface corresponds to the first and/or second ground plane. In example embodiments, measurements by one or more sensors associated with a mode of transportation to which the imaging device is affixed captured in real- or near real-time with the capturing of the first image data are used to determine a slope of the first ground plane. In example embodiments, the movement parameters are determined in real-time or near real-time with respect to the capturing of the second image data.

According to another aspect of the present invention, an apparatus specifically configured to at least perform visual odometry in low illumination conditions is provided. In an example embodiment, the apparatus comprises at least one processor and at least one memory storing computer program code. The at least one memory and the computer program code are configured to, with the processor, cause the apparatus to at least capture first image data comprising a first image. The first image is captured by an imaging device. The at least one memory and the computer program code are further configured to, with the processor, cause the apparatus to at least identify a fixed light source from the first image data; determine a first ground plane in the first image data; and determine a first intersection. The first intersection is a point in the first image where a virtual lamp post corresponding to the fixed light source in the first image intersects with the ground plane. The virtual lamp post extends vertically from the fixed light source to the first ground plane. The at least one memory and the computer program code are further configured to, with the processor, cause the apparatus to at least capture second image data comprising a second image. The second image is captured by the imaging device. The second image sufficiently overlaps with the first image. The at least one memory and the computer program code are further configured to, with the processor, cause the apparatus to at least identify the fixed light source in the second image data; and determine a second intersection. The second intersection is the point in the second image where a virtual lamp post corresponding to the fixed light source in the second image data intersects with a second ground plane. The at least one memory and the computer program code are further configured to, with the processor, cause the apparatus to at least transform the first image data and the second image data to obtain a first inverse perspective map comprising a first transformed intersection and a second inverse perspective map comprising a second transformed intersection; and based at least in part on the first transformed intersection and the second transformed intersection, determine one or more movement parameters related to movement of the imaging device between the capturing of the first image data and the capturing of the second image data.

In example embodiments, the movement parameters comprise at least one selected from the group of (a) one or more translation parameters, (b) one or more rotation parameters, (c) a distance traveled, (d) a position, (e) a speed, (f) a velocity, and (g) a heading. In example embodiments, the at least one memory and the computer program code are further configured to, with the processor, cause the apparatus to determine the second ground plane in the second image data. In example embodiments, the first ground plane is same as the second ground plane. In example embodiments, the imaging device is affixed to a mode of transportation at either a fixed height, a known height, or both. In example embodiments, the first and/or second ground plane is determined by computing a homography based at least in part on the first or second image data. In example embodiments the height of the imaging device is determined based on either a length of a lane marking, the distance between consecutive lane markings, width of a lane between a pair of lane markings, or combination thereof based on an image captured by the imaging device. In example embodiments, the first and/or second ground plane is determined using gradients in a color and/or intensity profile of the first or second image data, changes in the color and/or intensity profile of the first or second image data, or a combination thereof. In example embodiments, the first and/or second ground plane is determined based at least in part on one or more local road features identified in at least the first or second image data and another set of captured image data. In example embodiments, the first and/or second ground plane is determined based at least in part on one or more objects identified in the first and/or second images. In example embodiments, a slope of the first and/or second ground plane is inferred based at least in part on an illumination profile caused by a light source associated with a mode of transportation to which the imaging device is affixed reflecting off a surface corresponding to the first and/or second ground plane. In example embodiments, a slope of the first and/or second ground plane is inferred based on the position of one or more lane markings within the first or second image data. In example embodiments, the at least one memory and the computer program code are further configured to, with the processor, cause the apparatus to perform a full reconstruction of a surface using dense optical flow techniques for areas illuminated by a light source associated with a mode of transportation to which the imaging device is affixed, wherein the surface corresponds to the first and/or second ground plane. In example embodiments, measurements by one or more sensors associated with a mode of transportation to which the imaging device is affixed captured in real- or near real-time with the capturing of the first image data are used to determine a slope of the first ground plane. In example embodiments, the movement parameters are determined in real-time or near real-time with respect to the capturing of the second image data.

According to yet another aspect of the present invention, a computer program product for performing visual odometry in low illumination conditions is provided. In an example embodiment, the computer program product comprises at least one non-transitory computer-readable storage medium having computer-executable program code instructions stored therein. The computer-executable program code instructions comprise program code instructions configured to cause first image data comprising a first image to be captured. The first image is captured by an imaging device. The computer-executable program code instructions further comprise program code instructions configured to identify a fixed light source from the first image data; determine a first ground plane in the first image data; and determine a first intersection. The first intersection is a point in the first image where a virtual lamp post corresponding to the fixed light source in the first image intersects with the ground plane. The virtual lamp post extends vertically from the fixed light source to the first ground plane. The computer-executable program code instructions further comprise program code instructions configured to cause second image data comprising a second image to be captured. The second image is captured by the imaging device. The second image sufficiently overlaps with the first image. The computer-executable program code instructions further comprise program code instructions configured to identify the fixed light source in the second image data; and determine a second intersection. The second intersection is the point in the second image where a virtual lamp post corresponding to the fixed light source in the second image data intersects with a second ground plane. The computer-executable program code instructions further comprise program code instructions configured to transform the first image data and the second image data to obtain a first inverse perspective map comprising a first transformed intersection and a second inverse perspective map comprising a second transformed intersection; and based at least in part on the first transformed intersection and the second transformed intersection, determine one or more movement parameters related to movement of the imaging device between the capturing of the first image data and the capturing of the second image data.

In example embodiments, the movement parameters comprise at least one selected from the group of (a) one or more translation parameters, (b) one or more rotation parameters, (c) a distance traveled, (d) a position, (e) a speed, (f) a velocity, and (g) a heading. In example embodiments, the computer-executable program code instructions further comprise program code instructions configured to determine the second ground plane in the second image data. In example embodiments, the first ground plane is same as the second ground plane. In example embodiments, the imaging device is affixed to a mode of transportation at either a fixed height, a known height, or both. In example embodiments, the first and/or second ground plane is determined by computing a homography based at least in part on the first or second image data. In example embodiments the height of the imaging device is determined based on either a length of a lane marking, the distance between consecutive lane markings, width of a lane between a pair of lane markings, or combination thereof based on an image captured by the imaging device. In example embodiments, the first and/or second ground plane is determined using gradients in a color and/or intensity profile of the first or second image data, changes in the color and/or intensity profile of the first or second image data, or a combination thereof. In example embodiments, the first and/or second ground plane is determined based at least in part on one or more local road features identified in at least the first or second image data and another set of captured image data. In example embodiments, the first and/or second ground plane is determined based at least in part on one or more objects identified in the first and/or second images. In example embodiments, a slope of the first and/or second ground plane is inferred based at least in part on an illumination profile caused by a light source associated with a mode of transportation to which the imaging device is affixed reflecting off a surface corresponding to the first and/or second ground plane. In example embodiments, a slope of the first and/or second ground plane is inferred based on the position of one or more lane markings within the first or second image data. In example embodiments, the computer-executable program code instructions further comprise program code instructions configured to perform a full reconstruction of a surface using dense optical flow techniques for areas illuminated by a light source associated with a mode of transportation to which the imaging device is affixed, wherein the surface corresponds to the first and/or second ground plane. In example embodiments, measurements by one or more sensors associated with a mode of transportation to which the imaging device is affixed captured in real- or near real-time with the capturing of the first image data are used to determine a slope of the first ground plane. In example embodiments, the movement parameters are determined in real-time or near real-time with respect to the capturing of the second image data.

In accordance with yet another example embodiment of the present invention, an apparatus is provided. The apparatus comprises means for capturing first image data comprising a first image. For example, the apparatus may comprise an imaging device for capturing the first image. The apparatus further comprises means for identifying a fixed light source from the first image data. The apparatus further comprises means for determining a first ground plane in the first image data. The apparatus further comprises means for determining a first intersection. The first intersection is a point in the first image where a virtual lamp post corresponding to the fixed light source in the first image intersects with the first ground plane. The virtual lamp post extends vertically from the fixed light source to the first ground plane. The apparatus further comprises means for capturing second image data comprising a second image. For example, the apparatus may comprise an imaging device for capturing the second image. The second image sufficiently overlaps with the first image. The apparatus further comprises means for identifying the fixed light source in the second image data. The apparatus further comprises means for determining a second intersection. The second intersection is the point in the second image where a virtual lamp post corresponding to the fixed light source in the second image intersects with a second ground plane. The apparatus further comprises means for transforming the first image data and the second image data to obtain a first inverse perspective map comprising a first transformed intersection and a second inverse perspective map comprising a second transformed intersection. The apparatus further comprises means for based at least in part on the first transformed intersection and the second transformed intersection, determining one or more movement parameters related to movement of the imaging device between the capturing of the first image data and the capturing of the second image data.

Methods, apparatus, and computer program products are provided in accordance with an example embodiment in order to determine one or more movement parameters using visual odometry in low illumination conditions. In example embodiments, a first image is captured. The first image is captured by an imaging device on board a mode of transportation. Based at least in part on a fixed light source in the first image data and a first ground plane in the first image data, a first intersection is determined in the first image. Second image comprising a second image is captured. The second image is captured by the imaging device. Based at least in part on the fixed light source in the second image data and a second ground plane in the second image data, a second intersection in the second image is determined. The first image data and the second image data is transformed to obtain a first inverse perspective map comprising a first transformed intersection and a second inverse map comprising a second transformed intersection. Based at least in part on the first transformed intersection and the second transformed intersection, determining one or more movement parameters related to movement of the mode of transportation between the capturing of the first image data and the capturing of the second image data. A communication comprising at least one of the one or more movement parameters are provided to a remote computing entity.

In an example embodiment, the communication comprises an identifier configured to indicate that the at least one of the one or more movement parameters were determined using visual odometry or low illumination condition visual odometry.

BRIEF DESCRIPTION OF THE DRAWINGS

Figure 1A:
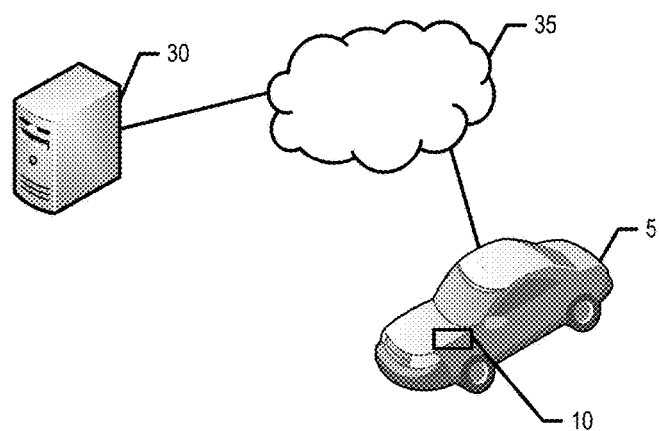
Figure 1B:
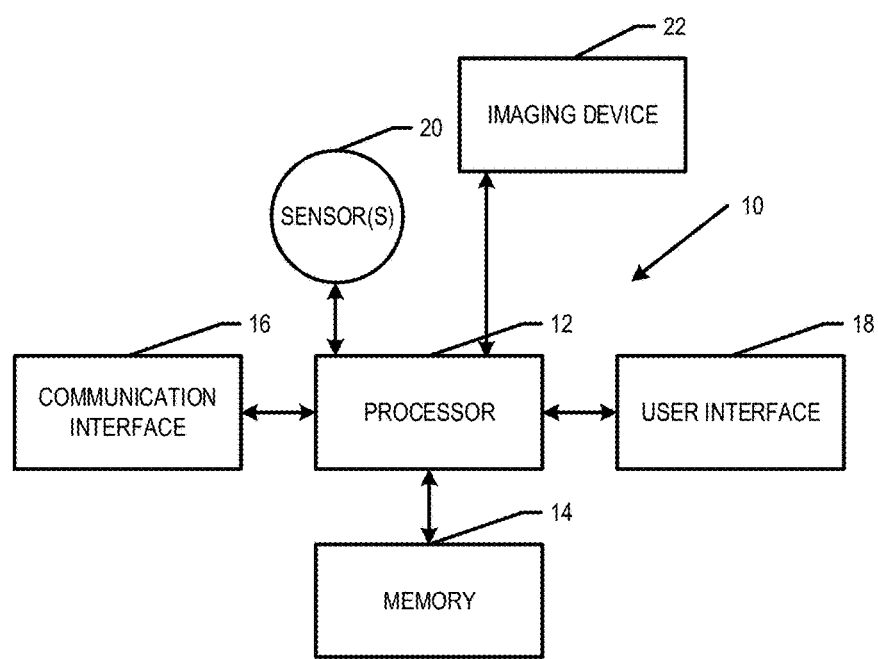
Figure 5:
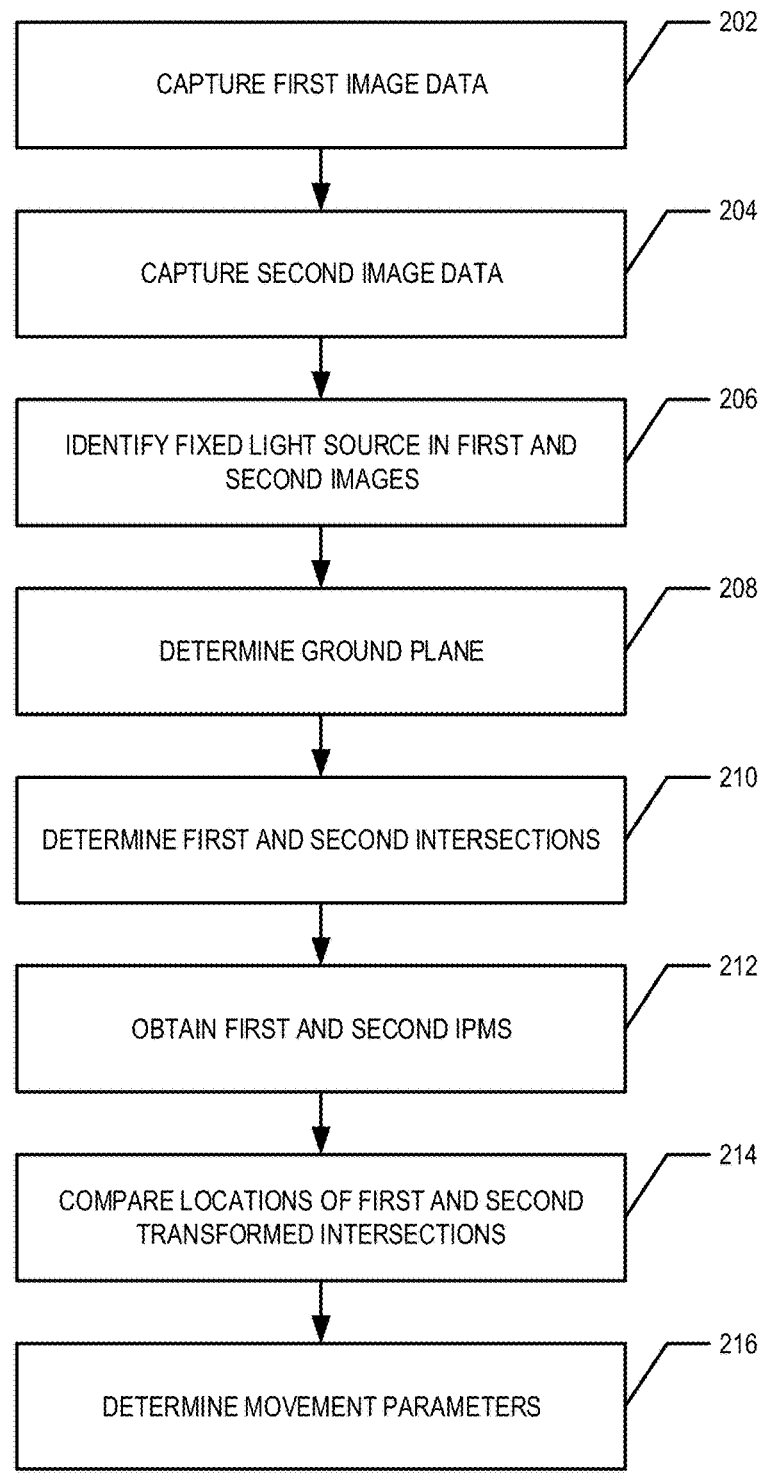

Having thus described certain example embodiments in general terms, reference will hereinafter be made to the accompanying drawings, which are not necessarily drawn to scale, and wherein:

FIG. 1A is a block diagram of a system that may be used to implement an example embodiment;

FIG. 1B is a block diagram of an apparatus that may be specifically configured in accordance with an example embodiment;

FIG. 2 is a flowchart illustrating operations performed, such as by the apparatus of FIG. 1B, in accordance with an example embodiment;

FIGS. 3A and 3B illustrate examples of processing captured image data, in accordance with an example embodiment;

FIGS. 4A, 4B, and 4C illustrates examples of inverse perspective maps (IMPs), in accordance with an example embodiment; and FIG. 5 is a flowchart illustrating operations performed, such as by the apparatus of FIG. 1B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Example embodiments of the present invention provide methods, systems, apparatuses, and computer program products for performing visual odometry in low illumination conditions. Some non-limiting examples of low illumination conditions are dusk, night, heavy cloud cover, and/or the like. In low illumination conditions, the identification of feature points in images and the matching of feature points across two or more images becomes difficult and/or impossible. In particular, traditional visual odometry requires matching of multiple feature points across two or more images such that the feature points remain consistent across all the considered images.

In example embodiments, a camera or other imaging device is mounted and/or affixed to a mode of transportation.

For example, a camera or other imaging device may be mounted and/or affixed to an automobile, truck, bus, airplane or other aircraft, train, subway, vehicle, car, boat, motorcycle, bicycle, a self-driving car, robot, and/or the like. The camera or other imaging device may be part of and/or in communication with an apparatus that is on board the mode of transportation and/or remote thereto. Visual odometry may be used to track, determine, monitor, compute, and/or the like the movement of the mode of transportation between the moment first image data is captured and the moment second image data is captured. For example, the movement of the mode of transportation may include a translation (e.g., a change in position) and/or rotation (e.g., a change in heading). For example, the position and orientation of the mode of transportation may be determined.

In example embodiments of the present invention, first image data is captured comprising a first image. At least one fixed light source is identified in the first image. In example embodiments, a fixed light source may be a street light, a reflective sign that is, for example, reflecting light from a vehicle's headlamps, and/or the like. The ground plane in the first image is identified. Next, a first intersection is identified. To identify the first intersection, a virtual lamp post may be extended vertically downward from the center of the fixe light source in the first image to the ground plane in the first image. The first intersection is a point representing the region, area, pixel, collection of pixels, and/or the like in the first image where the ground plane and the virtual lamp post that extends vertically downward from the center of the fixed light source intersect.

In example embodiments, second image data is captured. The second image data comprises a second image that sufficiently overlaps with the first image. In particular, the second image overlaps with the first image at least in the vicinity of the fixed light source. For example, the fixed light source may be identified in the second image and a second intersection where a virtual lamp post that extends vertically from the center of the fixed light source in the second image to the ground plane in the second image may be determined. In example embodiments, the ground plane identified and/or determined in the first image may be used to determine the ground plane in the second image. In other embodiments, the ground plane in the second image is identified and/or determined independently of the first image and used to determine the second intersection.

The first and second images may be synthetically warped, transformed, and/or the like to obtain first and second inverse perspective maps (IPMs) corresponding to the first and second images. The first IPM may comprise a first transformed intersection that is the mapping of the first intersection into the first IPM. The second IPM may comprise a second transformed intersection that is the mapping of the second intersection into the second IPM. The relative difference in position between the first transformed intersection in the first IPM and the second transformed intersection in the second IPM indicates the relative movement of the camera or other imaging device (e.g., the mode of transportation the camera or other imaging device is mounted and/or affixed to) between the moment when the first image data was captured and the moment with the second image data was captured.

FIG. 1A provides an illustration of an example system that can be used in conjunction with various embodiments of the present invention. For example, the system may comprise one or more apparatuses 10 each on board a mode of transportation 5 and one or more computing entity 30. In particular, FIG. 1A illustrates a mode of transportation 5 (e.g., automobile, truck, bus, airplane or other aircraft, train, subway, vehicle, car, boat, motorcycle, bicycle, a self-driving car, robot, and/or the like) having an apparatus 10 on board. In example embodiments, the apparatus 10 may be affixed to the mode of transportation 5 or may simply be on board the mode of transportation 5. The apparatus 10 may be in communication with computing entity 30 through network 35. In example embodiments, the computing entity 30 may be a server or other computing device. For example, the computing entity 30 may comprise one or more processing elements, on or more memories, one or more communication interfaces, one or more user interfaces, and/or the like. In example embodiments, the computing entity 30 may be remotely located with respect to the apparatus 10. Each of the components of the system may be in electronic communication with, for example, one another over the same or different wireless or wired networks 35 including, for example, a wired or wireless Personal Area Network (PAN), Local Area Network (LAN), Metropolitan Area Network (MAN), Wide Area Network (WAN), cellular network, and/or the like. In some embodiments, a network 35 may comprise the automotive cloud, digital transportation infrastructure (DTI), radio data system (RDS)/high definition radio (HD) or other digital radio system, and/or the like. For example, an apparatus 10 may be in communication with a computing entity 30 via the network 35. For example, the apparatus 10 may communicate with the computing entity 30 via the Cloud.

FIG. 1B provides an illustration of an example apparatus that can be specifically configured to perform visual odometry in low illumination conditions, in accordance with embodiments of the present invention. In example embodiments, an apparatus 10 may comprise components similar to those shown in the example apparatus 10 diagrammed in FIG. 1B.

In example embodiments, the apparatus 10 may comprise a processor 12, memory 14, a communications interface 16, a user interface 18, one or more sensors 20 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), illumination or light sensors, inertial measurement units (imus), and/or other sensors that enable the vehicle apparatus to determine one or more features of the corresponding vehicle's surroundings), one or more imaging devices 22 (e.g., visual camera(s)) and/or other components configured to perform various operations, procedures, functions or the like described herein). Example embodiments of the apparatus 10 are described in more detail below with respect to FIG. 1B.

II. Exemplary Operation

In example embodiments, the apparatus 10 may be configured to monitor, track, determine, compute, and/or the like one or movement parameters describing and/or related to the movement of a mode of transportation 5. In example embodiments, the movement parameters may comprise one or more of (a) one or more translation parameters, (b) one or more rotation parameters (e.g., indicating a change in heading), (c) a distance traveled, (d) a position, (e) a speed, (f) a velocity, (g) a heading, and/or the like. In example embodiments, the apparatus 10 may be on board the corresponding mode of transportation 5. However, in one embodiment, the apparatus 10 is remote from the corresponding mode of transportation 5 and is configured to receive image data captured by an imaging device 22 on board the mode of transportation 5 by way of a wired or wireless network or other data transmission. In example embodiments, the apparatus 10 may be configured to monitor, track, determine, compute, and/or the like the movement of the mode of transportation 5, at least partially, using visual odometry. In particular, the apparatus 10 may use visual odometry to monitor, track, determine, compute, and/or the like the movement of the mode of transportation 5 in areas where geo-positioning methods are inaccurate and/or unavailable (e.g., in urban canyons, in tunnels, and/or the like).

In example embodiments, the apparatus 10 may comprise one or more sensors 20. The one or more sensors 20 may comprise an illumination sensor or other light sensor configured to determine when the mode of transportation 5 is traveling under low illumination conditions. In another example embodiment, the imaging device 22 may capture image data and the apparatus 10 (e.g., the processor 12) may be configured to determine when the illumination level, brightness, feature resolution, image texture, and/or the like indicates that the mode of transportation is traveling under low illumination conditions. In an example embodiment, a clock associated with the apparatus 10 may be used to predict when the mode of transportation 5 is traveling under low illumination conditions. For example, when the clock indicates that it is dusk or night time, it may be expected that the mode of transportation 5 is traveling under low illumination conditions. When it is determined (e.g., based on captured image data and/or based on measurements, readings, and/or the like captured by an illumination or other light sensor, based on a clock, and/or the like) that the transportation mode is traveling under low illumination conditions, the apparatus 10 may be configured to a monitor, track, determine, compute, and/or the like the movement of the mode of transportation 5 using the visual odometry for low illumination conditions provided herein.

In example embodiments of the present invention, first image data is captured comprising a first image. A fixed light source is identified in the first image. For example, the fixed light source may be a blob of light in the first image. For example, the fixed light source may be a street lamp, a traffic light, a reflective sign that is reflecting light provided by the headlamps of the mode of transportation 5 or other light source, and/or the like. In example embodiments, multiple fixed light sources may be identified in the first image and used to monitor, track, determine, compute, and/or the like the movement of the mode of transportation 5 (e.g., one or more movement parameters). For example, multiple sets of movement parameters (e.g., describing and/or related to the translation and rotation of the mode of transportation) may be determined using multiple fixed light sources. The movement parameters may then be averaged and/or otherwise combined to provide a combined set of movement parameters. For the sake of clarity, the determination of the movement parameters will be described with reference to one fixed light source; however, one of skill in the art should understand that multiple fixed light sources may be used to perform visual odometry in low illumination conditions based on the teachings provided herein.

The first ground plane in the first image is determined based on the height of the imaging device 22 and the intrinsic parameters of the imaging device 22. For example, the intrinsic parameters of the imaging device 22 may comprise the focal length and distortion parameters. For example, the intrinsic parameters of the imaging device 22 may comprise the F number, the lens aperture, the smallest F number of the lens, the actual focal length of the lens, f-stops, and/or the like. In example embodiments, the imaging device 22 may be mounted and/or affixed to the mode of transportation 5 at a known and fixed height. In some example embodiments, the height of the imaging device 22 and/or one or more parameters of the imaging device 22 may be determined, estimated, computed, and/or the like based on analysis of one or more images (e.g., the first image, the second image, and/or the like). For example, the parameters of the imaging device 22 may be determined using a calibration method (either offline or online in the field). In some example embodiments, the first ground plane may be assumed to be generally flat. In some example embodiments, the first ground plane may be assumed to be locally planar, but not generally flat. For example, it may be assumed and/or determined that the first ground plane is sloped. In example embodiments, the slope of the first ground plane may be determined through a variety of methods, as will be discussed in more detail below.

Once the fixed light source and the ground plane have been identified and/or determined in the first image, a virtual lamp post may be extended vertically downward from the center of the fixed light source to the first ground plane within the first image. The first intersection is the point, area, region, pixel, set of pixels, and/or the like where the virtual lamp post intersects the first ground plane within the first image. The first intersection is a fixed point. The first image, having the first intersection marked, identified, tagged, and/or the like therein, may be transformed, synthetically warped, and/or the like to obtain a first IPM. In example embodiments, the first IPM may be obtained, based at least in part, on the intrinsic parameters (e.g., focal length, distortion parameters, and/or the like) of the imaging device 22 and the determined ground plane. The first intersection may be mapped from the first image into a first transformed intersection in the first IPM.

Similarly, at some moment after the capturing of the first image data, second image data may be captured. The second image data may comprise a second image that sufficiently overlaps with the first image. For example, the second image also contains the identified fixed light source. A second intersection may be determined, identified, and/or the like based on where a vertical lamp post that extends vertically downward from the fixed light source in the second image intersects the ground plane of the second image. In example embodiments, the determined first ground plane in the first image may be used to estimate the ground plane in the second image for purposes of determining, identifying, and/or the like the second intersection. In some example embodiments, a second ground plane (e.g., the ground plane in the second image) may be determined, identified, and/or the like. Methods used to determine, identify, and/or the like the second ground plane may be similar to those described with respect to the ground plan determined, identified, and/or the like in the first image.

After determining, identifying, and/or the like the second intersection, the second image, having the second intersection marked, identified, tagged, and/or the like therein, may be transformed, synthetically warped, and/or the like to obtain a second IPM. In example embodiments, the second IPM may be obtained, based at least in part, on the intrinsic parameters (e.g., focal length, distortion parameters, and/or the like) of the imaging device 22 and the determined ground plane. In example embodiments, the first image 50 and the second image 60 are captured by the same imaging device 22 in a fixed setting (e.g., the focal length and lens aperture unchanged between the capturing of the first image and the capturing of the second image) distortions in the first image and the second image are generally similar. The second intersection may be mapped from the second image into the second IPM to provide a second transformed intersection. As the first intersection and the second intersection relate to the same fixed point on the ground, the location of the first transformed intersection in the first IPM and the second transformed intersection in the second IPM may be compared to determine the movement parameters describing and/or related to the movement of the mode of transportation between the moment the first image data was captured and the moment the second image data was captured. For example, the relative positions of the first transformed intersection in the first IPM and the second transformed intersection in the second IPM may be used to determine the movement parameters the for the mode of transportation between the moment the first image data was captured and the moment the second image data was captured.

FIG. 2 provides a flowchart illustrating processes and operations performed, such as by the apparatus 10, to determine the movement parameters of a mode of transportation 5 performing visual odometry under low illumination conditions. Starting at block 102, first image data is captured. For example, the apparatus 10 may capture first image data. For example, the apparatus 10 may comprise means, such as the processor 12, memory 14, sensor(s) 20, imaging device 22, and/or the like, for capturing first image data. In example embodiments, the first image data comprises a first image (e.g., captured by the imaging device 22) and associated metadata (e.g., timestamp, sensor information/data captured in real-time or near real-time with the capture of the first image by one or more sensors 20, and/or the like). In the present context, real-time is taken to mean the actual time during which a process or event occurs or within milliseconds or microseconds thereof. Similarly, near real-time is taken to mean delayed from real-time only and/or primarily by data processing, network transmission, and/or similar processes. At block 104, a fixed light source is identified in the first image. For example, the apparatus 10 may identify a fixed light source in the first image. For example, the apparatus 10 may comprise means, such as processor 12 and/or the like, for identifying a fixed light source in the first image. In example embodiments, a fixed light source may be identified in the first image based at least in part on the first image data. In example embodiments, the fixed light source may be identified by identifying a region of the first image that is brighter than the adjacent regions of the first image. In example embodiments, the position of the fixed light source in the first image may be identified by identifying a local maximum in the brightness of the image space. In example embodiments, the fixed light source is identified as a blob-like pattern in the first image. In some embodiments, the blob-like pattern may be identified in the first image using a Laplacian or Gaussian filter. In example embodiments, a fixed light source may be identified by a convolutional neural network trained on a large number of labeled images of fixed light sources in low illumination conditions. In example embodiments, a lamp detector module may be defined such that the apparatus 10 may call and execute the lamp detector module on the first image data to identify the fixed light source. In example embodiments, the identified light sources within the first image (e.g., the identified blob-like patterns) may be filtered to remove light sources that are not fixed light sources (e.g., headlights from other cars, and/or the like). For example, a lamp detector module may be trained (e.g., using a supervised machine learning approach) to discern fixed light sources (e.g., street lights, reflective street signs, and/or the like) from other light sources in an image. For example, geometric context in the scene may be used to filter out light sources from objects on the ground, such as cars. In another example, a mask approach may be used to filter out some irrelevant light sources by masking specific areas of the image (e.g., straight upfront on the road, far ahead field up in the sky) where non-fixed light sources are likely to be located. Thus, in example embodiments, a lamp detector module may be configured to identify all blob-like patterns within an image and then filter and/or classify the identified light sources into fixed light sources that may be used and non-fixed light sources that are ignored.

FIG. 3A provides an example of a first image 50 comprising a fixed light source 70. In this illustrated example, the fixed light source 70 is a reflective sign. The fixed light source 70 may be identified based on the blob-like shape and brightness, in example embodiments.

Returning to FIG. 2, at block 106, a first ground plane is determined in the first image. In example embodiments, the first ground plane may be a plane or other two dimensional surface, or a projection thereof, in the first image representing the location of the ground surface. For example, the apparatus 10 may determine the location of a ground plane in the first image. For example, the apparatus 10 may comprise means, such as processor 12 and/or the like, for determining a first ground plan in the first image. For example, as shown in FIG. 3A, the first ground plane 81 may be determined and/or identified. In example embodiments, the determination of the first ground plane may be based at least in part on one or more intrinsic parameters of the imaging device 22 that captured the first image. In example embodiments, the first ground plane may be determined and/or identified based on the height of the imaging device 22 that captured the first image. In example embodiments, the height of imaging device 22 may be known. For example, the imaging device 22 may be affixed at a known and/or fixed height on the mode of transportation 5. For example, using the height of the imaging device 22, the ground plane may be directly determined, identified, computed and/or the like using a homography.

In some example embodiments, the height of the imaging device 22 may not be known and/or may need to be (re)calibrated. In such example embodiments, the height of the imaging device 22 may be determined by processing (e.g., by the processor 12) one or more images captured by the imaging device 22. In an example embodiment, the length and/or distance between successive lane markings and/or the width of a lane as indicated by the bracketing lane markings may be used to determine the height of the imaging device 22 and/or (re)calibrate the height of the imaging device 22. For example, lane markings tend to be highly visible under low illumination conditions wherein headlights and/or the like provided by the mode of transportation 5 may be emitting light into the field of view of the imaging device 22. Lane markings generally correspond to a fixed length. For example, highways in the United States generally have a lane width of 3.7 meters, lane markings of length 3.04 meters, and a spacing between consecutive lane markings of 30 meters. Therefore, applying one or more of these known quantities to the first image (or another image captured by the imaging device 22), the scale of the image may be determined and basic geometry may be used to determine, compute, and/or the like the height of the imaging device 22.

In example embodiments, the first ground plane 81 may be determined by determining, identifying, and/or the like the road edge based on gradients and/or changes in the color and/or intensity profile of the first image. A homography may then be computed using points from the edge of the road to determine the first ground plane 81 in the first image 50. In example embodiments, local road features (e.g., cracks in the pavement, potholes, and/or the like) and/or road edges may be matched between consecutive and/or near consecutive images (e.g., images 1 and 3 or 1 and 4 of a series of images) captured by the imaging device 22. A two-frame structure from motion, as determined from the consecutive and/or near consecutive images (e.g., the first and second images), may provide an estimate of the height of the imaging device 22. A homography may then be computed based on the estimated height of the imaging device 22 to determine, identify, compute, and/or the like the first ground plane 81. In example embodiments, whole image context maybe used to estimate the first ground plane. For example, parked or moving vehicles (or other objects) in the scene may be identified in the first image 50. Based on the location of the vehicles (or other objects) in the first image 50, the first ground plane 81 may be estimated.

In example embodiments, it may be assumed that the first ground plane 81 is locally planar. In some example embodiments, it may be assumed that the first ground plane 81 is generally flat. For example, the homography based on the height of the imaging device 22 may be computed assuming that the first ground plane 81 is generally flat and locally planar. In some example embodiments, a road profile may be determined that may be used to determine and/or identify the first ground plane 81 without assuming that the first ground plane is flat. In example embodiments, the road profile may correspond to the profile (flat, slanted, upslope, downslope, the roll and/or pitch of the road, and/or the like) of a road, path, and/or the like located on/in the first ground plane 81 and along which the mode of transportation 5 is traveling. In some example embodiments, the road profile may be determined based on the reflection profile of the headlights (or other light source provided by the mode of transportation 5 and projected into a field of view of the imaging device 22 and/or one or more sensors 20) as they are reflected off of the road surface or other element of the first ground plane 81. For example, the headlights of a mode of transportation reflect differently off an upwardly sloping road surface than headlights reflecting off of a downwardly sloping road surface. In an example embodiment, a supervised learning technique may be trained to predict a road profile based on an illumination and/or reflection profile of the of the headlights (or other light source provided by the mode of transportation 5 and projected into a field of view of the imaging device 22 and/or one or more sensors 20). For example, the supervised learning technique may be trained based on a collection of samples of different known road profiles and the corresponding illumination and/or reflection profiles. Thus, given a new illumination and/or reflection profile, the apparatus 10 (e.g., the processor 12 and/or the like) may predict the corresponding road profile. In an example embodiment, the position of lane markings may be used to predict a road profile. For example, the position of a lane marking may be used to infer a road profile local to the lane marking. It may then be assumed that the local road profile is a better estimation of the road profile for determining the first ground plane 81 than simply assuming that the ground surface is flat. In an example embodiment, the roll and/or pitch of the road profile may be determined based on sensor information/data collected, captured, measured, and/or the like by one or more sensors 20 onboard the mode of transportation 5. For example, the one or more sensors may comprise one or more gyroscopes and/or other intertial measurement units (IMUs) that may provide direct and/or indirect measurements of the roll and/or pitch of the road surface in the vicinity of the mode of transportion 5 (e.g., with respect to the location of the tires/wheels of the mode of transportation, and/or the like). In an example embodiment, a road profile may be determined by performing a full reconstruction of the road surface. For example, the full reconstruction of the road surface may be determined using dense optical flow techniques in the areas illuminated by the headlights or other light sources of the mode of transportation 5.

Continuing with FIG. 2, at block 108, a first intersection 91 may be identified, determined, and/or the like. For example, the apparatus 10 may be configured to identify, determine, and/or the like the first intersection 91. In example embodiments, the first intersection 91 is the region, area, pixel, collection of pixels, and/or the like in the first image 50 where the first ground plane 81 and a virtual lamp post 75 that extends vertically downward from the center of the fixed light source 70 intersect. In example embodiments, the first intersection 91 may be a point representing the region, area, pixel, collection of pixels, and/or the like in the first image 50 where the first ground plane and a virtual lamp post 75 that extends vertically downward from the center of the fixed light source 70 intersect. For example, a virtual lamp post 75 may be extended vertically downward from the center of the fixed light source 70 (e.g., the center of the bright blob in the first image identified as the fixed light source) until the virtual lamp post 75 intersects the first ground plane 81. For example, FIG. 3A shows a virtual lamp post 75 extending vertically downward from the center of the blob comprising, indicating, and/or the like the location of fixed light source 70 in the first image 50. The virtual lamp post 75 extends vertically downward from the center of the blob until reaching, intersecting, and/or the like the first ground plane 81. The area, region, pixel, collection of pixels, and/or the like in the first image where the virtual lamp post 75 intersects the first ground plane 81 is the first intersection 91.

Returning to FIG. 2, at block 110, the first image 50 is synthetically warped, transformed, and/or the like the first image to obtain a first IPM. In example embodiments, the first IPM may be a bird's eye view version of the first image. For example, the apparatus 10 may synthetically warp, transform and/or the like the first image 50 to obtain the first IPM. For example, the apparatus 10 may comprise means, such as the processor 12 and/or the like, for synthetically warping, transforming, and/or the like the first image 50 to obtain the first IPM. FIG. 4A shows an example of the first IPM 55. In example embodiments, the synthetic warping, transforming and/or the like of the first image 50 to obtain the first IPM 55 may be based at least in part on the height of the imaging device 22 and/or the determined first ground plane. In some embodiments, the synthetic warping, transforming, and/or the like of the first image 50 to obtain the first IPM 55 may assume that the first ground plane is generally planar and/or locally planar. In example embodiments, the first IPM 55 comprises the second transformed intersection 95, which is the mapping of the first intersection 91 from the first image 50 into the first IPM 55. As can be seen in FIG. 4A, the transformation from the first image 50 to the first IPM 55 causes the virtual lamp post 75' to be warped. However, the first intersection 91 may be mapped into the first IPM 55, as the first transformed intersection 95 thereby providing a fixed point with respect to the first and second IPMs 55, 65. For example, the first and second transformed intersections 95, 96 provide a common reference position between the first and second IPMs 55, 65.

Returning to FIG. 2, at some point after capturing the first image data, second image data is captured, at block 112. The second image data comprises a second image 60 that overlaps sufficiently with the first image 50. For example, as shown by FIGS. 3A and 3B, the second image 60 overlaps with the first image 50 at least in the vicinity of the fixed light source 70. For example, the second image 60 may overlap sufficiently with the first image 50 if the fixed light source 70 is present in both the first image 50 and the second image 60. In some embodiments, the second image 60 may overlap sufficiently with the first image 50 if the second intersection 92 (e.g., the region, area, pixel, collection of pixels in the first image, and/or a point representative thereof, where the second ground plane 82 and a virtual lamp post 76 that extends vertically downward from the center of the fixed light source 70 intersect) is present in and/or may be determined from the second image 60. In example embodiments, the apparatus 10 may capture second image data. In example embodiments, the apparatus 10 may comprise means, such as processor 12, memory 14, sensor(s) 20, imaging device 22, and/or the like, for capturing second image data. In example embodiments, the second image data comprises a second image 60 (e.g., captured by the imaging device 22) and associated metadata (e.g., timestamp, sensor information/data captured in real-time or near real-time with the capture of the second image data by one or more sensors 20, and/or the like). In example embodiments, the second image data may be captured at any point after the capturing of the first image data and such that the second image sufficiently overlaps the first image.

At block 114, the fixed light source 70 is identified in the second image 60. For example, the apparatus 10 may identify the fixed light source 70 in the second image 60. For example, the apparatus 10 may comprise means, such as processor 12 and/or the like, for identifying the fixed light source 70 in the second image 60. In example embodiments, a fixed light source 70 may be identified in the second image 60 based at least in part on the second image data. In example embodiments, the fixed light source may be identified by identifying a region of the second image that is brighter than the regions of the second image surrounding the brighter region. In example embodiments, the position of the fixed light source in the second image may be identified by identifying a local maximum in the brightness of the image space. In example embodiments, the fixed light source is identified as a blob-like pattern in the second image. In some embodiments, the blob-like pattern may be identified in the second image using a Laplacian or Gaussian filter. In example embodiments, the fixed light source may be identified by a convolutional neural network trained on a large number of labeled images of fixed light sources in low illumination conditions. In example embodiments, a lamp detector module may be defined such that the apparatus 10 may call and execute the lamp detector module on the second image data to identify the fixed light source. In example embodiments, the identified light sources within the second image (e.g., the identified blob-like patterns) may be filtered to remove light sources that are not fixed light sources (e.g., headlights from other cars, and/or the like). For example, a lamp detector module may be trained (e.g., using a supervised machine learning approach) to discern fixed light sources (e.g., street lights, reflective street signs, and/or the like) from other light sources in an image. For example, geometric context in the scene may be used to filter out light sources from objects on the ground, such as cars.

In another example, a mask approach may be used to filter out some irrelevant light sources by masking specific areas of the image (e.g., straight upfront on the road, far ahead field up in the sky) where non-fixed light sources are likely to be located. Thus, in example embodiments, a lamp detector module may be configured to identify all blob-like patterns within an image and then filter and/or classify the identified light sources into fixed light sources that may be used and non-fixed light sources that are ignored.

FIG. 3B provides an example of a second image 60 comprising the fixed light source 70. The fixed light source 70 may be identified based on the blob-like shape and brightness, in example embodiments. As maybe seen by comparing FIGS. 3A and 3B, the position of the fixed light source 70 in the first image 50 and the second image 60 has changed due to movement of the mode of transportation 5 between the capturing of the first image data and the capturing of the second image data. However, the fixed light source 70 is present in both the first image 50 and the second image 60. Thus, the second image sufficiently overlaps the first image.

Returning to FIG. 2, at block 116, a second ground plane 82 is determined in the second image. In example embodiments, the second ground plane 82 may be a plane or other two dimensional surface, or a projection thereof, in the second image representing the location of the ground surface in the second image 60. For example, the apparatus 10 may determine the location of a second ground plane 82 in the second image 60. For example, the apparatus 10 may comprise means, such as processor 12 and/or the like, for determining a second ground plane 82 in the second image 60. For example, as shown in FIG. 3B, the second ground plane 82 may be determined and/or identified. In example embodiments, the first ground plane 81 may be assumed to also be the second ground plane 82. For example, the first ground plane 81 determined, identified, and/or the like in the first image 50 and/or based on the first image data may be assumed to represent the ground surface in the second image 60. In other example embodiments, a second ground plane 82 may be determined/identified through a process that is informed by the determination of the first ground plane 81 without assuming that the second ground plane 82 is the same as the first ground plane 81. For example, if the height of the imaging device 22 was determined to determine/identify the first ground plane 81, the determined height of the imaging device 22 may be applied in determining/identifying the second ground plane 82 in order to increase the efficiency of the process and reduce unnecessary redundancy. In some embodiments, a second ground plane 82 may be independently determined and/or identified in the second image 60, without using information/data determined for determining and/or identifying the first ground plane 81.

In example embodiments, the determination of the second ground plane 82 may be based at least in part on one or more intrinsic parameters of the imaging device 22 that captured the second image 60. In example embodiments, the second ground plane 82 may be determined and/or identified based on the height of the imaging device 22 that captured the second image 60. In example embodiments, the height of imaging device 22 may be known. For example, the imaging device 22 may be affixed at a known and/or fixed height on the mode of transportation 5. For example, using the height of the imaging device 22, the second ground plane 82 may be directly determined, identified, computed and/or the like using a homography based on the height of the imaging device 22, the second image data, and/or the like.

In some example embodiments, the height of the imaging device 22 may not be known and/or may need to be (re)calibrated. In such example embodiments, the height of the imaging device 22 may be determined by processing (e.g., by the processor 12) one or more images captured by the imaging device 22 (e.g., the first and/or second images). In an example embodiment, the length and/or distance between successive lane markings and/or the width of a lane bracketed by lane markings may be used to determine the height of the imaging device 22 and/or (re)calibrate the height of the imaging device 22. For example, lane markings tend to be highly visible under low illumination conditions wherein headlights and/or the like provided by the mode of transportation 5 may be emitting light into the field of view of the imaging device 22. Lane markings generally correspond to a fixed length. For example, highways in the United States have a lane width of 3.7 meters, lane markings of length 3.04 meters, and a spacing between consecutive lane markings of 30 meters. Therefore, applying one or more of these known quantities to the second image 60 (or another image captured by the imaging device 22), the scale of the image may be determined and basic geometry may be used to determine, compute, and/or the like the height of the imaging device 22.

In example embodiments, the second ground plane 82 may be determined by determining, identifying, and/or the like the road edge based on gradients and/or changes in the color and/or intensity profile of the first image. A homography may then be computed using points from the edge of the road to determine the second ground plane 82 in the second image 60. In example embodiments, local road features (e.g., cracks in the pavement, potholes, and/or the like) and/or road edges may be matched between consecutive and/or near consecutive images (e.g., images 1 and 3 or 1 and 4 of a series of images) captured by the imaging device 22 (e.g., the first and second images). A two-frame structure from motion, as determined from the consecutive and/or near consecutive images, may provide an estimate of the height of the imaging device 22. A homography may then be computed based on the estimated height of the imaging device 22 to determine, identify, compute, and/or the like the second ground plane 82. In example embodiments, whole image context maybe used to estimate the second ground plane 82. For example, parked or moving vehicles (or other objects) in the scene may be identified in the second image 60. Based on the location of the vehicles (or other objects) in the second image 60, the second ground plane 82 may be estimated.

In example embodiments, it may be assumed that the second ground plane 82 is locally planar. In some example embodiments, it may be assumed that the second ground plane 82 is generally flat. For example, the homography based on the height of the imaging device 22 may be computed assuming that the second ground plane 82 is generally flat and locally planar. In some example embodiments, a road profile may be determined that may be used to determine and/or identify the second ground plane 82 without assuming that the second ground plane 82 is flat. In example embodiments, the road profile may correspond to the profile (flat, slanted, upslope, downslope, the roll and/or pitch of the road, and/or the like) of a road, path, and/or the like located on/in the second ground plane 82 and along which the mode of transportation 5 is traveling. In some example embodiments, the road profile may be determined based on the illumination and/or reflection profile of the headlights (or other light source provided by the mode of transportation 5 and projected into a field of view of the imaging device 22 and/or one or more sensors 20) as they are reflected off of the road surface or other element of the second ground plane 82. For example, the headlights of a mode of transportation 5 reflect differently off an upwardly sloping road surface than headlights reflecting off of a downwardly sloping road surface. In an example embodiment, a supervised learning technique may be trained to predict a road profile based on an illumination and/or reflection profile of the headlights (or other light source provided by the mode of transportation and projected into a field of view of the imaging device 22 and/or one or more sensors 20). For example, the supervised learning technique may be trained based on a collection of samples of different known road profiles and the corresponding illumination and/or reflection profiles. Thus, given a new illumination and/or reflection profile, the apparatus 10 (e.g., the processor 12 and/or the like) may predict the corresponding road profile. In an example embodiment, the position of lane markings may be used to predict a road profile. For example, the position of a lane marking may be used to infer a road profile local to the lane marking. It may then be assumed that the local road profile is a better estimation of the road profile for determining the second ground surface than simply assuming that the ground surface is flat. In an example embodiment, the roll and/or pitch of the road profile may be determined based on sensor information/data collected, captured, measured, and/or the like by one or more sensors 20 onboard the mode of transportation 5. For example, the one or more sensors may comprise one or more gyroscopes and/or other intertial measurement units (IMUs) that may provide direct and/or indirect measurements of the roll and/or pitch of the road surface in the vicinity of the mode of transportion 5 (e.g., with respect to the location of the tires/wheels of the mode of transportation, and/or the like). In an example embodiment, a road profile may be determined by performing a full reconstruction of the road surface. For example, the full reconstruction of the road surface may be determined using dense optical flow techniques in the areas illuminated by the headlights or other light sources of the mode of transportation 5.

Continuing with FIG. 2, at block 118, a second intersection 92 may be identified, determined, and/or the like. For example, the apparatus 10 may be configured to identify, determine, and/or the like the second intersection 92 in the second image 60. In example embodiments, the second intersection 92 is the region, area, pixel, collection of pixels, and/or the like in the second image where the second ground plane 82 and a virtual lamp post 76 that extends vertically downward from the center of the fixed light source 70 intersect. In example embodiments, the second intersection 92 may be a point representing the region, area, pixel, collection of pixels, and/or the like in the second image 60 where the ground plane 82 and a virtual lamp post 76 that extends vertically downward from the center of the fixed light source 70 intersect. For example, a virtual lamp post 76 may be extended vertically downward from the center of the fixed light source 70 (e.g., the center of the bright blob in the second image 60 identified as the fixed light source 70) until the virtual lamp post 76 intersects the second ground plane 82. For example, FIG. 3B shows a virtual lamp post 76 extending vertically downward from the center of the blob comprising, indicating, and/or the like the location of fixed light source 70 in the second image 60. The virtual lamp post 76 extends vertically downward from the center of the blob until reaching, intersecting, and/or the like the second ground plane 82. The area, region, pixel, collection of pixels, and/or the like in the second image 60 where the virtual lamp post 76 intersects the first ground plane 82 is the first intersection 92.

Returning to FIG. 2, at block 120, the second image 60 is synthetically warped, transformed, and/or the like the first image to obtain a second IPM 65. FIG. 4B shows an example of the second IPM 65. In example embodiments, a second IPM 65 may be a bird's eye view version of the second image 60. For example, the apparatus 10 may synthetically warp, transform and/or the like the second image 60 to obtain the second IPM 65. For example, the apparatus 10 may comprise means, such as the processor 12 and/or the like, for synthetically warping, transforming, and/or the like the second image 60 to obtain the second IPM 65. In example embodiments, the synthetic warping, transforming and/or the like of the second image 60 to obtain the second IPM 65 may be based at least in part on the height of the imaging device 22 and/or the determined second ground plane 82. In some embodiments, the synthetic warping, transforming, and/or the like of the second image 60 to obtain the second IPM 65 may assume that the second ground plane 82 is generally planar and/or locally planar. In example embodiments the second IPM 65 comprises the second transformed intersection 96, which is the mapping of the second intersection 92 from the second image 60 into the second IPM 65.

Continuing with FIG. 2, at block 125, after the first IPM 55 comprising the first transformed intersection 95 and the second IPM 65 comprising the second transformed intersection 96 have been obtained, or in response thereto, the location of first transformed intersection 95 in the first IPM 55 and the location of the second transformed intersection 96 in the second IPM 65 may be compared. For example, the apparatus 10 may compare the location of first transformed intersection 95 in the first IPM 55 and the location of the second transformed intersection 96 in the second IPM 65. For example, FIG. 4C shows the first IPM 55 overlaid on the second IPM 65, showing the difference in the location of the first transformed intersection 95 in the first IPM 55 and the location of the second transformed intersection 96 in the second IPM 65.

Returning to FIG. 2, at block 130, the movement parameters describing and/or related to the motion of the mode of transportation 5 between the moment the first image data was captured and the moment the second image data was captured are determined. In example embodiments, the movement parameters are based on the comparison of the location of first transformed intersection 95 in the first IPM 55 and the location of the second transformed intersection 96 in the second IPM 65. For example, the apparatus 10 may determine the movement parameters based on the comparison of the location of first transformed intersection 95 in the first IPM 55 and the location of the second transformed intersection 96 in the second IPM 65. For example, the apparatus may comprise means, such as the processor 12 and/or the like, for determining the movement parameters based on the comparison of the location of first transformed intersection 95 in the first IPM 55 and the location of the second transformed intersection 96 in the second IPM 65. For example, the movement parameters may comprise a translation (e.g., a two-dimensional translation indicating movement along the ground surface) and a rotation (e.g., a change in heading, pitch, and/or roll) corresponding to movement of the mode of transportation 5 in the time between the moment the first image data was captured and the moment the second image data was captured. For example, as shown in FIG. 4C, the first transformed intersection 95 and the second transformed intersection 96 are separated by a distance of D indicating that the mode of transportation moved a distance of D along the ground surface between the moment the first image data was captured and the moment the second image data was captured.

For example, the first transformed intersection 95 is located at point $p_1$ corresponding to $(x_1, y_1)$ and the second transformed intersection 96 is located at point $p_2$ corresponding to $(x_2, y_2)$. As the first and second transformed intersections 95, 96 are located on the ground plane (e.g., the first or second ground plane 81, 82), the ground plane may be assigned the value z=0 and the determination of the movement parameters may be determined in two dimensions (e.g., x and y), in example embodiments. In some embodiments, for example for applications concerned with the slant and/or pitch of the road profile, the movement parameters may be determined in three dimensions such that the rotation parameters relate not only to a change in heading of the mode of transportation 5, but may also indicate a change in the roll and/or pitch angles of the mode of transportation 5.

In example embodiments, the translation parameters of the movement parameters may be determined by computing $((x_2-x_1), (y_2-y_1))$. For example, the distance D traveled by the mode of transportation 5 between the moment the first image data was captured and the moment the second image data was captured is $D=\sqrt{(x_2-x_1)^2+(y_2-y_1)^2}$. To determine the speed or velocity of the mode of transportation 5 between the moment the first image data was captured and the moment the second image data was captured (e.g., the average speed or velocity), the translation parameters may be divided by the amount of time between the first image data was captured and the moment the second image data was captured. For example, the velocity of the mode of transportation 5 is $$\left( \frac{(x_2 - x_1)}{(\Delta t)}, \frac{(y_2 - y_1)}{(\Delta t)} \right)$$

and the speed is $$\frac{\sqrt{(x_2 - x_1)^2 + (y_2 - y_1)^2}}{\Delta t}.$$

In example embodiments, $\Delta t$ is the amount of time between the moment the first image data was captured and the moment the second image data was captured. In example embodiments, $\Delta t$ may be determined based on the frequency (e.g., in Hz) with which the imaging device 22 captures the images. In another example embodiment, the first image data comprises a time stamp indicating a time $t_1$ at which the first image data was captured and the second image data comprises a time stamp indicating a time $t_2$ at which the second image data was captured. The time $\Delta t$ may then be $t_2-t_1$. The rotation parameter of the movement parameters may be determined by computing atan 2 $((x_2-x_1),(y_2-y_1))$, where atan 2 is the two argument arctangent function. In another example, the change in heading of the mode of transportation may be determined by correlating the shift of second transformed intersection 96 relative to the first transformed intersection 95. For example, the location of the first transformed intersection 95 with respect to a left side and a right side of the first IPM 55 compared to the location of the second transformed intersection 96 with respect to the left side and the right side of the second IPM may be analyzed to determine a rotation from which a heading change (and/or a heading) may be derived. In example embodiments, the heading of the mode of transportation 5 may be determined based on the rotation of the mode of transportation 5 since the previous heading determination.

One of skill in the art will understand that $p_1$ and $p_2$ may be generalized as a set of first transformed intersections 95 in the first IPM 55 (corresponding to a set of fixed light sources 70) and a set of second transformed intersections 96 in the second IPM 65 (corresponding to the set of fixed light sources 70). For example, $$P_1 = \begin{bmatrix} x_1^a & x_1^b & \ldots & x_1^n \\ y_1^a & y_1^b & \ldots & y_1^n \end{bmatrix} \text{ and } P_2 = \begin{bmatrix} x_2^a & x_2^b & \ldots & x_2^n \\ y_2^a & y_2^b & \ldots & y_2^n \end{bmatrix},$$

for n identified fixed light sources 70. Computing the movement parameters may then comprise a generalization of the above to determine the translation and rotation parameters describing and/or related to the motion of the mode of transportation 5 between the moment the first image data was captured and the moment the second image data was captured are determined. For example, the translation parameter of the movement parameters may be determined by computing the difference in the mean values of the two point sets. For example, the mathematical formalism of a perspective N-point (pnp) problem may be applied to determine the movement parameters describing and/or related to the translation and the rotation of the mode of transportation based on singular value decomposition of $P_1$ and $P_2$.

In example embodiments, the determination of the movement parameters are determined in real-time or near real-time. For example, the apparatus 10 may determine the movement parameters indicating the change in position (e.g., translation) and the change in heading, and/or possibly pitch and/or roll (e.g., rotation), of the mode of transportation 5 in real-time or near real-time with the capturing of the second image data. For example, the movement parameters may be determined as quickly as computationally possible after the capturing of the second image data such that when the movement parameters are determined the position and heading of the movement parameters are still a good approximation of the current, real-time state of the mode of transportation 5. In example embodiments, the apparatus 10 may use the determined movement parameters to make real-time or near real-time decisions regarding the movement of the mode of transportation 5. In example embodiments, one or more movement parameters (e.g., translation parameters, rotation parameters, speed, velocity, heading, and/or the like) may be provided (e.g., transmitted) to the computing entity 30, for example, through network 35.

FIG. 5 provides a flowchart illustrating a similar alternative process that may be used to perform visual odometry in low illumination conditions, in accordance with example embodiments of the present invention. Starting at block 202, the first image data is captured. For example, the apparatus 10 may capture the first image data. For example, the apparatus 10 may comprise means, such as the processor 12, memory 14, sensor(s) 20, imaging device 22, and/or the like, for capturing the first image data. In example embodiments, the first image data comprises a first image 50 (e.g., captured by the imaging device 22) and associated metadata (e.g., timestamp, sensor information/data captured in real-time or near real-time with the capture of the first image data by one or more sensors 20, and/or the like).

At block 204, second image data is captured. For example, the apparatus 10 may capture the second image data. For example, the apparatus 10 may comprise means, such as the processor 12, memory 14, sensor(s) 20, imaging device 22, and/or the like, for capturing the second image data. In example embodiments, the second image data comprises a second image 60 (e.g., captured by the imaging device 22) and associated metadata (e.g., timestamp, sensor information/data captured in real-time or near real-time with the capture of the second image data by one or more sensors 20, and/or the like). The second image data comprises a second image 60 that overlaps sufficiently with the first image 50. For example, the second image 60 overlaps the first image 50 at least in the vicinity of the fixed light source 70. For example, the second image 60 may overlap sufficiently with the first image 50 if the fixed light source 70 is present in both the first image and the second image. In some embodiments, the second image 60 may overlap sufficiently with the first image 50 if the fixed light source 70 and the second intersection 92 (e.g., the region, area, pixel, collection of pixels in the second image 60, and/or a point representative thereof, where the ground plane 82 and a virtual lamp post 76 that extends vertically downward from the center of the fixed light source 70 intersect) is present in and/or may be determined from the second image 60.

At block 206, a fixed light source 70 is identified in the first and second images 50, 60. For example, the fixed light source 70 may be identified in both the first and second images 50, 60 substantially simultaneously. In some embodiments, the first and second images 50, 60 may be processed in parallel to identify the fixed light source 70 and then the first and second images 50, 60 may be matched to ensure that a fixed light source 70 identified in one image corresponds to a fixed light source identified in the other image. In some embodiments, the first and second images 50, 60 may be processed together to identify a fixed light source 70 present in both the first and second images 50, 60. For example, the apparatus 10 may identify a fixed light source 70 in the first and second images 50, 60. For example, the apparatus 10 may comprise means, such as processor 12 and/or the like, for identifying a fixed light source 70 in the first image 50 and the second image 60. In example embodiments, a fixed light source 70 may be identified in the first and second images 50, 60 based at least in part on the first image data and/or the second image data. In example embodiments, the fixed light source 70 may be identified by identifying a region of the first image 50 and/or the second image 60 that is brighter than the adjacent regions of the corresponding image. In example embodiments, the position of the fixed light source 70 in the first image 50 and/or second image 60 may be identified by identifying a local maximum in the brightness of the corresponding image space. In example embodiments, the fixed light source 70 is identified as a blob-like pattern in the first image 50 and/or second image 60. In some embodiments, the blob-like pattern may be identified in the first image 50 and/or second image 60 using a Laplacian or Gaussian filter. In example embodiments, a fixed light source 70 may be identified by a convolutional neural network trained on a large number of labeled images of fixed light sources in low illumination conditions. In example embodiments, a lamp detector module may be defined such that the apparatus 10 may call and execute the lamp detector module on the first and/or second image data to identify the fixed light source 70. In example embodiments, the identified light sources within the first and/or second images (e.g., the identified blob-like patterns) may be filtered to remove light sources that are not fixed light sources (e.g., headlights from other cars, and/or the like). For example, a lamp detector module may be trained (e.g., using a supervised machine learning approach) to discern fixed light sources (e.g., street lights, reflective street signs, and/or the like) from other light sources in an image. For example, geometric context in the scene may be used to filter out light sources from objects on the ground, such as cars. In another example, a mask approach may be used to filter out some irrelevant light sources by masking specific areas of the image (e.g., straight upfront on the road, far ahead field up in the sky) where non-fixed light sources are likely to be located. Thus, in example embodiments, a lamp detector module may be configured to identify all blob-like patterns within an image and then filter and/or classify the identified light sources into fixed light sources that may be used and non-fixed light sources that are ignored.

At block 208, the ground plane (e.g., 81, 82) is determined. In example embodiments, the ground plane (e.g., 81, 82) may be determined based at least in part on the first image data and/or the second image data. In example embodiments, it may be assumed that the first ground plane 81 is the same as the second ground plane 82. In particular in the region of interest (e.g., in the vicinity of the first and second intersections 91, 92) the ground surface is substantially the same in the first and second images 50, 60. For example, the apparatus 10 may determine a ground plane (e.g., 81, 82) in the first and/or second images 50, 60. For example, the apparatus 10 may comprise means, such as processor 12 and/or the like, for determining a ground plane (e.g., 81, 82) in the first image 50 and/or second image 60. In example embodiments, the determination of the ground plane (e.g., the first and second ground planes which are assumed to be the same ground plane or at least similar enough that only one of the ground planes need be determined to provide sufficient accuracy in the movement parameters) may be based at least in part on one or more intrinsic parameters of the imaging device 22 that captured the first and/or second image 50, 60. In example embodiments, the ground plane (e.g., 81, 82) may be determined and/or identified based on the height of the imaging device 22 that captured the first and/or second images 50, 60. In example embodiments, the height of imaging device 22 may be known. For example, the imaging device 22 may be affixed at a known and/or fixed height on the mode of transportation. For example, using the height of the imaging device 22, the ground plane (e.g., 81, 82) may be directly determined, identified, computed and/or the like using a homography based on the height of the imaging device 22, first and/or second image data, and/or the like.

In some example embodiments, the height of the imaging device 22 may not be known and/or may need to be (re)calibrated. In such example embodiments, the height of the imaging device 22 may be determined by processing (e.g., by the processor 12) one or more images captured by the imaging device 22 (e.g., the first and/or second images 50, 60). In an example embodiment, the length and/or distance between successive lane markings and/or the width of a lane bracketed by lane markings may be used to determine the height of the imaging device 22 and/or (re)calibrate the height of the imaging device 22. For example, lane markings tend to be highly visible under low illumination conditions wherein headlights and/or the like provided by the mode of transportation may be emitting light into the field of view of the imaging device 22. Lane markings generally correspond to a fixed length. For example, highways in the United States have a lane width of 3.7 meters, lane markings of length 3.04 meters, and a spacing between consecutive lane markings of 30 meters. Therefore, applying one or more of these known quantities to the first and/or second image 50, 60 (or another image captured by the imaging device 22), the scale of the image may be determined and basic geometry may be used to determine, compute, and/or the like the height of the imaging device 22.

In example embodiments, the ground plane (e.g., 81, 82) may be determined by determining, identifying, and/or the like the road edge based on gradients and/or changes in the color and/or intensity profile of the first and/or second images 50, 60. A homography may then be computed using points from the edge of the road to determine the ground plane (e.g., 81, 82) in the first and/or second images 50, 60. In example embodiments, local road features (e.g., cracks in the pavement, potholes, and/or the like) and/or road edges may be matched between consecutive and/or near consecutive images (e.g., images 1 and 3 or 1 and 4 of a series of images) captured by the imaging device 22 (e.g., first and second images 50, 60). A two-frame structure from motion, as determined from the consecutive and/or near consecutive images, may provide an estimate of the height of the imaging device 22. A homography may then be computed based on the estimated height of the imaging device 22 to determine, identify, compute, and/or the like the ground plane (e.g., 81, 82). In example embodiments, whole image context maybe used to estimate the ground plane. For example, parked or moving vehicles (or other objects) in the scene may be identified in the first and/or second images 50, 60. Based on the location of the vehicles (or other objects) in the first and/or second images, the ground plane (e.g., 81, 82) may be estimated.

In example embodiments, it may be assumed that the ground plane (e.g., 81, 82) is locally planar. In some example embodiments, it may be assumed that the ground plane (e.g., 81, 82) is generally flat. For example, the homography based on the height of the imaging device 22 may be computed assuming that the ground plane (e.g., 81, 82) is generally flat and locally planar. In some example embodiments, a road profile may be determined that may be used to determine and/or identify the ground plane (e.g., 81, 82) without assuming that the ground plane is flat. In example embodiments, the road profile may correspond to the profile (flat, slanted, upslope, downslope, the roll and/or pitch of the road, and/or the like) of a road, path, and/or the like located on/in the ground plane (e.g., 81, 82) and along which the mode of transportation 5 is traveling. In some example embodiments, the road profile may be determined based on the reflection profile of the headlights (or other light source provided by the mode of transportation 5 and projected into a field of view of the imaging device 22 and/or one or more sensors 20) as they are reflected off of the road surface or other element of the ground plane (e.g., 81, 82). For example, the headlights of a mode of transportation reflect differently off an upwardly sloping road surface than headlights reflecting off of a downwardly sloping road surface. In an example embodiment, a supervised learning technique may be trained to predict a road profile based on an illumination and/or reflection profile of the of the headlights (or other light source provided by the mode of transportation 5 and projected into a field of view of the imaging device 22 and/or one or more sensors 20). For example, the supervised learning technique may be trained based on a collection of samples of different known road profiles and the corresponding illumination and/or reflection profiles. Thus, given a new illumination and/or reflection profile, the apparatus 10 (e.g., the processor 12 and/or the like) may predict the corresponding road profile. In an example embodiment, the position of lane markings may be used to predict a road profile. For example, the position of a lane marking may be used to infer a road profile local to the lane marking. It may then be assumed that the local road profile is a better estimation of the road profile for determining the ground plane (e.g., 81, 82) than simply assuming that the ground plane is flat. In an example embodiment, the roll and/or pitch of the road profile may be determined based on sensor information/data collected, captured, measured, and/or the like by one or more sensors 20 on board the mode of transportation 5. For example, the one or more sensors 20 may comprise one or more gyroscopes and/or other intertial measurement units (IMUs) that may provide direct and/or indirect measurements of the roll and/or pitch of the road surface in the vicinity of the mode of transportion 5 (e.g., with respect to the location of the tires/wheels of the mode of transportation, and/or the like). In an example embodiment, a road profile may be determined by performing a full reconstruction of the road surface. For example, the full reconstruction of the road surface may be determined using dense optical flow techniques in the areas illuminated by the headlights or other light sources of the mode of transportation 5.

At block 210, the first and second intersections 91, 92 are identified, determined, and/or the like. For example, the apparatus 10 may be configured to identify, determine, and/or the like the first intersection 91 in the first image 50 and the second intersection 92 in the second image 60. In example embodiments, the first intersection 91 is the region, area, pixel, collection of pixels and/or the like in the first image 50 where the ground plane (e.g., 81, 82) and a virtual lamp post 75 that extends vertically downward from the center of the fixed light source 70 in the first image 50 intersect. In example embodiments, the second intersection 92 is the region, area, pixel, collection of pixels, and/or the like in the second image 60 where the ground plane (e.g., 81, 82) and a virtual lamp post 76 that extends vertically downward from the center of the fixed light source 70 in the second image 60 intersect. In example embodiments, the first (second) intersection 91 (92) may be a point representing the region, area, pixel, collection of pixels, and/or the like in the first (second) image 50 (60) where the ground plane (e.g., 81, 82) and a virtual lamp post 75 (76) that extends vertically downward from the center of the fixed light source 70 intersect. For example, a virtual lamp post 75 (76) may be extended vertically downward from the center of the fixed light source 70 in the first (second) image 50 (60) (e.g., the center of the bright blob in the first (second) image identified as the fixed light source) until the virtual lamp post intersects the ground plane (e.g., 81, 82) in the first (second) image to determine, identify, and/or the like the first (second) intersection 91 (92).

At block 212, the first and second IPMs 55, 65 are obtained. For example, the first image 50 may be synthetically warped, transformed, and/or the like to obtain the first IPM 55 and the second image 60 may be synthetically warped, transformed, and/or the like to obtain the second IPM 65. In example embodiments, the first (second) IPM 55 (65) may be a bird's eye view version of the first (second) image 50 (60). For example, the apparatus 10 may synthetically warp, transform, and/or the like the first image 50 to obtain the first IPM 55 and synthetically warp, transform, and/or the like the second image 60 to obtain the second IPM 65. For example, the apparatus 10 may comprise means, such as the processor 12 and/or the like, for synthetically warping, transforming, and/or the like the first image 50 to obtain the first IPM 55 and for synthetically warping, transforming, and/or the like the second image 60 to obtain the second IPM 65. In example embodiments, the synthetic warping, transforming and/or the like of the first (second) image 50 (60) to obtain the first (second) IPM 55 (65) may be based at least in part on the height of the imaging device 22 and/or the determined ground plane (e.g., 81, 82). In example embodiments, the first IPM 55 comprises a first transformed intersection 95 corresponding to the first intersection 91 in the first image 50 and the second IPM 65 comprises a second transformed intersection 96 corresponding to the second intersection 92 in the second image 60. For example, the first transformed intersection 95 is the mapping of the first intersection 91 from the first image 50 into the first IPM 55. For example, the second transformed intersection 96 is the mapping of the first intersection 92 from the second image 60 into the second IPM 65.

At block 214, after the first IPM 55 comprising the first transformed intersection 95 and the second IPM 65 comprising the second transformed intersection 96 have been obtained, or in response thereto, the location of the first transformed intersection 95 in the first IPM 55 and the second transformed intersection 96 in the second IPM 65 may be compared. For example, the apparatus 10 may compare the location of the first transformed intersection 95 in the first IPM 55 and the second transformed intersection 96 in the second IPM 65. For example, the apparatus 10 may comprise means, such as the processor 12 and/or the like, for comparing the location of the first transformed intersection 95 in the first IPM 55 and the second transformed intersection 96 in the second IPM 65.

At block 216, the movement parameters describing and/or related to the motion of the mode of transportation between the moment the first image data was captured and the moment the second image data was captured are determined. In example embodiments, the movement parameters are based on the comparison of the location of first transformed intersection 95 in the first IPM 55 and the location of the second transformed intersection 96 in the second IPM 65. For example, the apparatus 10 may determine the movement parameters based on the comparison of the location of first transformed intersection 95 in the first IPM 55 and the location of the second transformed intersection 96 in the second IPM 65. For example, the apparatus may comprise means, such as the processor 12 and/or the like, for determining the movement parameters based on the comparison of the location of first transformed intersection 95 in the first IPM 55 and the location of the second transformed intersection 96 in the second IPM 65. For example, the movement parameters may comprise a translation (e.g., a two-dimensional translation indicating movement along the ground surface) and a rotation (e.g., a change in heading, pitch, and/or roll). For example, the movement parameters may be determined based on the location of first transformed intersection 95 in the first IPM 55 and the location of the second transformed intersection 96 in the second IPM 65 as described above. In example embodiments, one or more movement parameters may be provided (e.g., transmitted) to the computing entity 30, for example, through network 35. For example, the apparatus 10 may provide a communication to the computing entity 30 (e.g., through the network 35) comprising one or more movement parameters and an identifier configured to indicate that the one or more movement parameters were determined using visual odometry, low illumination condition visual odometry, and/or the like.

III. Example Apparatus

The apparatus 10 of an example embodiment may be embodied by or associated with a variety of computing devices including, for example, such as a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as position determination and motion tracking. In example embodiments, the apparatus 10 may be further configured to perform additional navigation-related functions such as digital routing and map display. In this regard, FIG. 1B depicts an apparatus 10 of an example embodiment that may be embodied by various computing devices including those identified above. As shown, the apparatus 10 of an example embodiment may include, may be associated with or may otherwise be in communication with a processor 12 and a memory device 14 and optionally a communication interface 16 and/or a user interface 18. The apparatus 10 may further comprise one or more sensors 20 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), illumination or light sensors, inertial measurement units (IMUs), and/or other sensors that enable the vehicle apparatus to determine one or more features of the corresponding vehicle's surroundings), and one or more imaging devices 22 (e.g., camera(s) and/or other imaging device(s)).

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus 10 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14 and/or the like).

The apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 2 and 5 illustrate flowcharts of apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   capturing first image data comprising a first image, the first image captured by an imaging device;
   identifying a fixed light source from the first image data;
   determining a first ground plane in the first image data;
   determining a first intersection wherein the first intersection is a point in the first image where a virtual lamp post corresponding to the fixed light source in the first image intersects with the first ground plane, wherein the virtual lamp post extends vertically from the fixed light source to the first ground plane;
   capturing second image data comprising a second image, the second image captured by the imaging device, wherein the second image sufficiently overlaps with the first image;
   identifying the fixed light source in the second image data;
   determining a second ground plane in the second image data;
   determining a second intersection, the second intersection is the point in the second image where a virtual lamp post corresponding to the fixed light source in the second image data intersects with the second ground plane;
   transforming the first image data and the second image data to obtain a first inverse perspective map comprising a first transformed intersection and a second inverse perspective map comprising a second transformed intersection; and
   based at least in part on the first transformed intersection and the second transformed intersection, determining one or more movement parameters related to movement of the imaging device between the capturing of the first image data and the capturing of the second image data.

2. A method according to claim 1, wherein the movement parameters comprise at least one selected from the group of (a) one or more translation parameters, (b) one or more rotation parameters, (c) a distance traveled, (d) a position, (e) a speed, (f) a velocity, and (g) a heading.

3. A method according to claim 1, wherein the first ground plane is applied as the second ground plane.

4. A method according to claim 1, wherein the imaging device is affixed to a mode of transportation at either a fixed height, a known height, or both.

5. A method according to claim 1, wherein the first and/or second ground plane is determined by computing a homography based at least in part on the first and/or second image data.

6. A method according to claim 1, wherein the height of the imaging device is determined based on either a length of a lane marking, the distance between consecutive lane markings, width of a lane between a pair of lane markings, or combination thereof based on an image captured by the imaging device.

7. A method according to claim 1, wherein the first and/or second ground plane is determined using gradients in a color and/or intensity profile of the first or second image data, changes in the color and/or intensity profile of the first or second image data, or a combination thereof.

8. A method according to claim 1, wherein the first and/or second ground plane is determined based at least in part on one or more local road features identified in at least the first or second image data and another set of captured image data.

9. A method according to claim 1, wherein the first and/or second ground plane is determined based at least in part on one or more objects identified in the first and/or second image.

10. A method according to claim 1, wherein a slope of the first and/or second ground plane is inferred based at least in part on an illumination profile caused by a light source associated with a mode of transportation to which the imaging device is affixed reflecting off a surface corresponding to the first or second ground plane.

11. A method according to claim 1, wherein a slope of the first and/or second ground plane is inferred based on the position of one or more lane markings within the first or second image data.

12. A method according to claim 1, further comprising
performing a full reconstruction of a surface using dense optical flow techniques for areas illuminated by a light source associated with a mode of transportation to which the imaging device is affixed,
wherein the surface corresponds to the first or second ground plane.

13. A method according to claim 1, wherein measurements by one or more sensors associated with a mode of transportation to which the imaging device is affixed captured in real- or near real-time with the capturing of the first or second image data are used to determine a slope of the first and/or second ground plane.

14. A method according to claim 1, wherein the movement parameters are determined in real-time or near real-time with respect to the capturing of the second image data.

15. An apparatus comprising at least one processor and at least one memory storing computer program code, the at least one memory and the computer program code configured to, with the processor, cause the apparatus to at least:
capture first image data comprising a first image, the first image captured by an imaging device;
identify a fixed light source from the first image data;
determine a first ground plane in the first image data;
determine a first intersection wherein the first intersection is a point in the first image where a virtual lamp post corresponding to the fixed light source in the first image intersects with the first ground plane, wherein the virtual lamp post extends vertically from the fixed light source to the first ground plane;
capture second image data comprising a second image, the second image captured by the imaging device, wherein the second image sufficiently overlaps with the first image;
identify the fixed light source in the second image data;
determine a second ground plane in the second image data;
determine a second intersection, the second intersection is the point in the second image where a virtual lamp post corresponding to the fixed light source in the second image data intersects with the second ground plane;
transform the first image data and the second image data to obtain a first inverse perspective map comprising a first transformed intersection and a second inverse perspective map comprising a second transformed intersection; and
based at least in part on the first transformed intersection and the second transformed intersection, determine one or more movement parameters related to movement of the imaging device between the capturing of the first image data and the capturing of the second image data.

16. An apparatus according to claim 15, wherein the movement parameters are determined in real-time or near real-time with respect to the capturing of the second image data.

17. An apparatus according to claim 15, wherein to determine the first ground plane, the at least one memory and the computer program code are configured to, with the processor, cause the apparatus to at least compute a homography based at least in part on the first image data.

18. A method according to claim 1, wherein the movement parameters comprise at least one selected from the group of (a) one or more translation parameters, (b) one or more rotation parameters, (c) a distance traveled, (d) a position, (e) a speed, (f) a velocity, and (g) a heading.

19. A computer program product comprising at least one non-transitory computer-readable storage medium having computer-executable program code instructions stored therein, the computer-executable program code instructions comprising program code instructions configured to:
cause first image data comprising a first image to be captured, the first image captured by an imaging device;
identify a fixed light source from the first image data;
determine a first ground plane in the first image data;
determine a first intersection wherein the first intersection is a point in the first image where a virtual lamp post corresponding to the fixed light source in the first image intersects with the first ground plane, wherein the virtual lamp post extends vertically from the fixed light source to the first ground plane;
cause second image data comprising a second image to be captured, the second image captured by the imaging device, wherein the second image sufficiently overlaps with the first image;
identify the fixed light source in the second image data;
determine a second ground plane in the second image data;
determine a second intersection, the second intersection is the point in the second image where a virtual lamp post corresponding to the fixed light source in the second image data intersects with the second ground plane;
transform the first image data and the second image data to obtain a first inverse perspective map comprising a first transformed intersection and a second inverse perspective map comprising a second transformed intersection; and
based at least in part on the first transformed intersection and the second transformed intersection, determine one or more movement parameters related to movement of the imaging device between the capturing of the first image data and the capturing of the second image data.

20. A method comprising:
capturing first image data comprising a first image, the first image captured by an imaging device on board a mode of transportation;
based at least in part on a fixed light source in the first image data and a first ground plane in the first image data, determining a first intersection in the first image;
capturing second image data comprising a second image, the second image captured by an imaging device;
based at least in part on the fixed light source in the second image data and a second ground plane in the second image data, determining a second intersection in the second image;
transforming the first image data and the second image data to obtain a first inverse perspective map comprising a first transformed intersection and a second inverse perspective map comprising a second transformed intersection;
based at least in part on the first transformed intersection and the second transformed intersection, determining one or more movement parameters related to movement of the mode of transportation between the capturing of the first image data and the capturing of the second image data; and providing a communication comprising at least one of the one or more movement parameters to a remote computing entity.

21. The method of claim 20, wherein the communication comprises an identifier configured to indicate that the at least one of the one or more movement parameters were determined using visual odometry or low illumination condition visual odometry.

* * * * *